US012681268B2

(12) United States Patent
Liu

(10) Patent No.: US 12,681,268 B2
(45) Date of Patent: Jul. 14, 2026

(54) CAMERA OPTICAL LENS

(71) Applicant: AAC OPTICS (CHANGZHOU) CO., LTD., Changzhou City (CN)

(72) Inventor: Ziwei Liu, Changzhou (CN)

(73) Assignee: AAC OPTICS (CHANGZHOU) CO., LTD., Changzhou City (CN)

( * ) Notice: Subject to any disclaimer, the term of this patent is extended or adjusted under 35 U.S.C. 154(b) by 253 days.

(21) Appl. No.: 18/731,382

(22) Filed: Jun. 3, 2024

(65) Prior Publication Data

US 2025/0271636 A1     Aug. 28, 2025

(30) Foreign Application Priority Data

Feb. 23, 2024     (CN) .......................... 202410202516.8

(51) Int. Cl.
    *G02B 9/62* (2006.01)
    *G02B 13/18* (2006.01)
(52) U.S. Cl.
    CPC ............... *G02B 9/62* (2013.01); *G02B 13/18* (2013.01)
(58) Field of Classification Search
    CPC ...... G02B 9/62; G02B 13/18; G02B 13/0045; G02B 13/06; G02B 13/0015
    USPC ......................................................... 359/713
    See application file for complete search history.

(56) References Cited

U.S. PATENT DOCUMENTS

| | | | | |
|---|---|---|---|---|
| 9,897,782 | B1 * | 2/2018 | Tsai ................... | G02B 13/0045 |
| 10,175,461 | B1 * | 1/2019 | Lai .......................... | G02B 13/06 |
| 11,372,214 | B2 * | 6/2022 | Teraoka ................... | G02B 9/62 |
| 11,782,236 | B2 * | 10/2023 | Li ............................ | G02B 9/62 |
| | | | | 359/713 |
| 2021/0041669 | A1 * | 2/2021 | Teraoka ................... | G02B 9/62 |
| 2021/0191078 | A1 * | 6/2021 | Chen ......................... | G02B 9/62 |
| 2021/0215909 | A1 * | 7/2021 | Hu .......................... | G02B 13/06 |
| 2021/0286152 | A1 * | 9/2021 | Jia ...................... | G02B 13/0045 |
| 2022/0066143 | A1 * | 3/2022 | Zhang .................... | H04N 23/55 |
| 2022/0091382 | A1 * | 3/2022 | Dou ......................... | G02B 9/62 |
| 2022/0091384 | A1 * | 3/2022 | Meng .................... | G02B 13/06 |
| 2022/0107481 | A1 * | 4/2022 | Li ...................... | G02B 13/0045 |
| 2022/0137342 | A1 * | 5/2022 | Zhou .................. | G02B 27/0025 |
| | | | | 359/714 |
| 2022/0137365 | A1 * | 5/2022 | Zhou .................. | G02B 13/0045 |
| | | | | 359/713 |
| 2022/0187574 | A1 * | 6/2022 | Yamazaki ................ | G02B 9/62 |
| 2022/0187576 | A1 * | 6/2022 | Sakaguchi ............. | G02B 13/06 |
| 2022/0252843 | A1 * | 8/2022 | Meng ................ | G02B 13/0045 |
| 2022/0404584 | A1 * | 12/2022 | Chuang ............. | G02B 13/0045 |

(Continued)

*Primary Examiner* — William R Alexander
(74) *Attorney, Agent, or Firm* — Wiersch Law Group

(57)     ABSTRACT

The present disclosure relates to the field of optical lens, and provides a camera optical lens, including, from an object side to an image side, a first lens, a second lens, a third lens, a fourth lens, a fifth lens and a sixth lens. The camera optical lens satisfies: 6.00≤R2/R1≤25.00, 2.00≤(R7+R8)/(R7−R8)≤9.00, and 3.00≤(d5+d9)/d7≤9.00. R1 represents a curvature radius of an object side surface of the first lens, R2 represents a curvature radius of an image side surface of the first lens, R7 represents a curvature radius of an object side surface of the fourth lens, R8 represents a curvature radius of an image side surface of the fourth lens, d5 represents an on-axis thickness of the third lens, d7 represents an on-axis thickness of the fourth lens, and d9 represents an on-axis thickness of the fifth lens.

10 Claims, 10 Drawing Sheets

10

(56)          References Cited

U.S. PATENT DOCUMENTS

| 2023/0020801 A1* | 1/2023 | Wang | ........................ G02B 9/62 |
| 2024/0045175 A1* | 2/2024 | Kondo | ................... G02B 13/18 |
| 2024/0210660 A1* | 6/2024 | Lee | .................... G02B 13/0045 |
| 2025/0085517 A1* | 3/2025 | Lee | .................... G02B 13/0045 |

* cited by examiner

Longitudinal aberration

510nm
555nm
470nm
610nm
435nm
656nm

Millimeter

Millimeter

Longitudinal aberration

510nm

555nm

470nm

610nm

435nm

656nm

Millimeter

50

GF   Si

L6

L1
L2
L3   L4   L5

S1

Longitudinal aberration

555nm

510nm

610nm

470nm

656nm

435nm

Millimeter

CAMERA OPTICAL LENS

CROSS REFERENCE TO RELATED APPLICATIONS

The present application claims the benefit of priority under the Paris Convention to Chinese Patent Application No. 202410202516.8 filed on Feb. 23, 2024, which is incorporated herein by reference in its entirety.

TECHNICAL FIELD

The present disclosure relates to the field of optical lens, and in particular to a camera optical lens suitable for handheld devices such as smart phones and digital cameras and camera devices such as monitors and PC lenses.

BACKGROUND

With the emergence of smart devices in recent years, the demand for miniature camera optical lenses is increasing day by day, but the pixel size of the photosensitive devices is shrinking, coupled with the current development trend of electronic products being that their functions should be better and their shape should be thin and small, miniature camera optical lens with good imaging quality therefor has become a mainstream in the market. In order to obtain better imaging quality, the lenses traditionally adopt a multi-piece lens structure. And, with the development of technology and the increase of the diverse demands of users, and under this circumstances that the pixel area of photosensitive devices is shrinking steadily and the requirement of the system for the imaging quality is improving constantly, the six-piece lens structure gradually appear in lens design. There is an urgent need for wide-angle camera lenses which have good optical characteristics and small volume, and the chromatic aberration of which is fully corrected.

SUMMARY

Aiming at the above problem, the main purpose of the present disclosure is to provide a camera optical lens that has good optical performance and meets the design requirements of large aperture, ultra-thin, and wide-angle.

To this end, the technical solutions of the present disclosure provide a camera optical lens, including, from an object side to an image side in sequence, a first lens with a negative refractive power, a second lens with a positive refractive power, a third lens with a positive refractive power, a fourth lens with a negative refractive power, a fifth lens with a positive refractive power, and a sixth lens with a negative refractive power. The camera optical lens satisfies the following conditions: $6.00 \leq R2/R1 \leq 25.00$, $2.00 \leq (R7+R8)/(R7-R8) \leq 9.00$, and $3.00 \leq (d5+d9)/d7 \leq 9.00$, where R1 represents a curvature radius of an object side surface of the first lens, R2 represents a curvature radius of an image side surface of the first lens, R7 represents a curvature radius of an object side surface of the fourth lens, R8 represents a curvature radius of an image side surface of the fourth lens, d5 represents an on-axis thickness of the third lens, d7 represents an on-axis thickness of the fourth lens, and d9 represents an on-axis thickness of the fifth lens.

As an improvement, the camera optical lens further satisfies the following condition: $2.00 \leq TTL/f \leq 2.30$, where TTL represents a total track length of the camera optical lens, and f represents a focal length of the camera optical lens.

As an improvement, the camera optical lens further satisfies the following condition: $-6.00 \leq f6/d11 \leq -3.00$, where f6 represents a focal length of the sixth lens, and d11 represents an on-axis thickness of the sixth lens.

As an improvement, the camera optical lens further satisfies the following condition: $2.50 \leq f2/f3 \leq 7.00$, where f2 represents a focal length of the second lens, and f3 represents a focal length of the third lens.

As an improvement, the object side surface of the first lens is concave in a paraxial region, and the image side surface of the first lens is convex in the paraxial region. The camera optical lens further satisfies the following conditions: $-5.26 \leq f1/f \leq -1.23$, $-2.80 \leq (R1+R2)/(R1-R2) \leq -0.72$, and $0.02 \leq d1/TTL \leq 0.06$, where f1 represents a focal length of the first lens, f represents a focal length of the camera optical lens, d1 represents an on-axis thickness of the first lens, and TTL represents a total track length of the camera optical lens.

As an improvement, an object side surface of the second lens is convex in a paraxial region, and an image side surface of the second lens is concave in the paraxial region. The camera optical lens further satisfies the following conditions: $1.50 \leq f2/f \leq 11.95$, $-54.86 \leq (R3+R4)/(R3-R4) \leq -4.92$, and $0.03 \leq d3/TTL \leq 0.11$, where f2 represents a focal length of the second lens, f represents a focal length of the camera optical lens, R3 represents a curvature radius of the object side surface of the second lens, R4 represents a curvature radius of the image side surface of the second lens, d3 represents an on-axis thickness of the second lens, and TTL represents a total track length of the camera optical lens.

As an improvement, an object side surface of the third lens is convex in a paraxial region, and an image side surface of the third lens is convex in the paraxial region. The camera optical lens further satisfies the following conditions: $0.57 \leq f3/f \leq 1.79$, $0.11 \leq (R5+R6)/(R5-R6) \leq 0.37$, and $0.06 \leq d5/TTL \leq 0.18$, where f3 represents a focal length of the third lens, f represents a focal length of the camera optical lens, R5 represents a curvature radius of the object side surface of the third lens, R6 represents a curvature radius of an image side surface of the third lens, and TTL represents a total track length of the camera optical lens.

As an improvement, the object side surface of the fourth lens is convex in a paraxial region, and the image side surface of the fourth lens is concave in the paraxial region. The camera optical lens further satisfies the following conditions: $-9.47 \leq f4/f \leq -2.92$, and $0.03 \leq d7/TTL \leq 0.09$, where f4 represents a focal length of the fourth lens, f represents a focal length of the camera optical lens, and TTL represents a total track length of the camera optical lens.

As an improvement, an object side surface of the fifth lens is concave in a paraxial region, and an image side surface of the fifth lens is convex in the paraxial region. The camera optical lens further satisfies the following conditions: $0.29 \leq f5/f \leq 0.89$, $0.83 \leq (R9+R10)/(R9-R10) \leq 2.60$, and $0.09 \leq d9/TTL \leq 0.26$, where f5 represents a focal length of the fifth lens, f represents a focal length of the camera optical lens, R9 represents a curvature radius of the object side surface of the fifth lens, R10 represents a curvature radius of the image side surface of the fifth lens, and TTL represents a total track length of the camera optical lens.

As an improvement, an object side surface of the sixth lens is convex in a paraxial region, and an image side surface of the sixth lens is concave in the paraxial region. The camera optical lens further satisfies the following conditions: $-1.44 \leq f6/f \leq -0.48$, $0.89 \leq (R11+R12)/(R11-R12) \leq 2.74$, and $0.04 \leq d11/TTL \leq 0.13$, where f6 represents a focal length of the sixth lens, f represents a focal length of the camera optical lens, R11 represents a curvature radius of the object side surface of the sixth lens, R12 represents a curvature radius of the image side surface of the sixth lens, d11 represents an on-axis thickness of the sixth lens, and TTL represents a total track length of the camera optical lens.

The beneficial effects of the present disclosure are: the camera optical lens provided by the present disclosure has excellent optical performance and characteristics of large aperture, ultra-thin, and wide-angle, and is particularly suitable for mobile phone camera lens components and WEB camera lenses composed of camera elements such as charge coupled devices (CCD) or complementary metal-oxide semiconductor sensors (CMOS sensors) with high pixel.

BRIEF DESCRIPTION OF DRAWINGS

For clearer descriptions of the technical solutions in the embodiments of the present disclosure, drawings that are to be referred for description of the embodiments are briefly described hereinafter. Apparently, the drawings described hereinafter merely illustrate some embodiments of the present disclosure. Persons of ordinary skill in the art can derive other drawings based on the drawings described herein without any creative effort.

DETAILED DESCRIPTION OF EMBODIMENTS

Figures 1, 2:
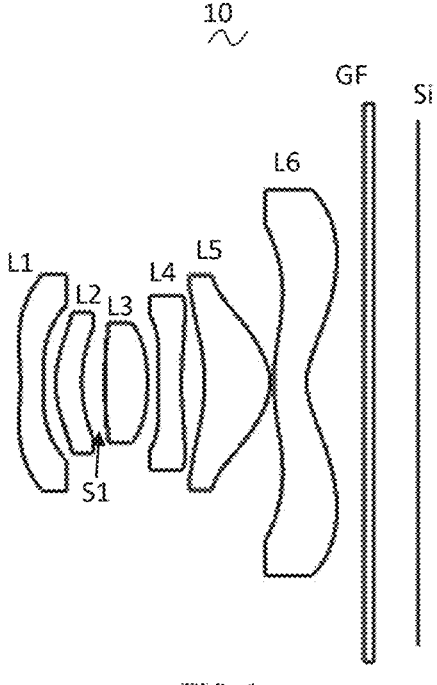
FIG. 1 is a schematic diagram of a structure of a camera optical lens according to a first embodiment of the present disclosure.
FIG. 2 is a schematic diagram of a longitudinal aberration of the camera optical lens shown in FIG. 1.

To make the objects, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

Referring to FIGS. 1 to 16, the technical solutions of the present disclosure provide camera optical lenses 10, 20, 30, 40, and FIGS. 1, 5, 9 and 13 show the camera optical lenses 10, 20, 30, 40 according to the present disclosure, respectively. Each of the camera optical lenses 10, 20, 30, 40 includes six lenses. Specifically, the camera optical lens includes, from an object side to an image side: a first lens L1, a second lens L2, an aperture S1, a third lens L3, a fourth lens L4, a fifth lens L5, and a sixth lens L6. An optical element such as an optical filter (GF) may be arranged between the sixth lens L6 and an image surface Si.

The first lens L1, the second lens L2, the third lens L3, the fourth lens L4, the fifth lens L5 and the sixth lens L6 are all made of plastic material. In other embodiments, each lens may also be of another material.

A curvature radius of an object side surface of the first lens L1 is defined as R1, a curvature radius of an image side surface of the first lens L1 is defined as R2, and the camera optical lens satisfies a condition of $6.00 \leq R2/R1 \leq 25.00$, which stipulates a shape of the first lens L1. Within this range, astigmatism and distortion of the camera lens can be corrected, thereby reducing the possibility of dark corners.

A curvature radius of an object side surface of the fourth lens L4 is defined as R7, a curvature radius of an image side surface of the fourth lens L4 is defined as R8, and the camera optical lens satisfies a condition of $2.00 \leq (R7+R8)/(R7-R8) \leq 9.00$, which stipulates a shape of the fourth lens L4. Within this range, a degree of deflection of light passing through the lens can be alleviated, and aberrations can be reduced effectively.

An on-axis thickness of the third lens L3 is defined as d5, an on-axis thickness of the fourth lens L4 is defined as d7, an on-axis thickness of the fifth lens L5 is defined as d9, and the camera optical lens satisfies a condition of $3.00 \leq (d5+d9)/d7 \leq 9.00$, which stipulates a ratio of a sum of the on-axis thickness of the third lens L3 and the on-axis thickness of the fifth lens L5 to the on-axis thickness of the fourth lens L4. Within this range, it is beneficial to reducing a total track length and thereby realizing an ultra-thin effect.

A total track length of the camera optical lens is defined as TTL, a focal length of the camera optical lens is defined as f, and the camera optical lens satisfies a condition of $2.00 \leq TTL/f \leq 2.30$, which stipulates a ratio of the total track length to the focal length of the system. Within this range, it is beneficial for the system to allocate a respective reasonable thickness to each lens, thereby allocating refractive powers reasonably.

A focal length of the sixth lens L6 is defined as f6, an on-axis thickness of the sixth lens L6 is defined as d11, and the camera optical lens satisfies a condition of $-6.00 \le f6/d11 \le -3.00$, which stipulates a ratio of the focal length of the sixth lens L6 to the on-axis thickness of the sixth lens. Within this range, it is beneficial for balancing a thickness of the sixth lens, thereby allocating a refractive power of this lens reasonably.

A focal length of the second lens L2 is defined as f2, a focal length of the third lens L3 is defined as f3, and the camera optical lens satisfies a condition of $2.50 \le f2/f3 \le 7.00$, which stipulates a ratio of the focal length of the second lens L2 to the focal length of the third lens L3. Within this range, distribution of refractive powers can be balanced effectively.

When the above conditions are satisfied, the camera optical lenses 10, 20, 30, 40 can have excellent optical performance and meet design requirement of wide-angle. With the characteristics of the camera optical lenses 10, 20, 30, 40, they are particularly suitable for mobile phone camera lens components and WEB camera lenses composed of camera elements such as CCDs or CMOS sensors with high pixel.

Based on the above conditions and the functions that can be achieved, characteristics of each lens are illustrated in detail as follows.

The object side surface of the first lens L1 is concave in a paraxial region, the image side surface of the first lens L1 is convex in the paraxial region, and the first lens L1 has a negative refractive power. The object side surface and the image side surface of the first lens L1 may also be set to other concave or convex distribution situations.

A focal length of the camera optical lens is defined as f, a focal length of the first lens L1 is defined as f1, and the camera optical lens satisfies a condition of $-5.26 \le f1/f \le -1.23$, which stipulates a ratio of the negative refractive power of the first lens L1 to the focal length of the camera optical lens. Within this range, the first lens L1 has a suitable negative refractive power, which is beneficial to reducing aberration of the system, and to development of the camera optical lens towards ultra-thin and wide-angle. As an improvement, the camera optical lens satisfies a condition of $-3.29 \le f1/f \le -1.54$.

The curvature radius of the object side surface of the first lens L1 is defined as R1, the curvature radius of the image side surface of the first lens L1 is defined as R2, and the camera optical lens satisfies a condition of $-2.80 \le (R1+R2)/(R1-R2) \le -0.72$. In this way, the shape of the first lens L1 can be controlled reasonably, such that the first lens L1 can effectively correct a spherical aberration of the system. As an improvement, the camera optical lens satisfies a condition of $-1.75 \le (R1+R2)/(R1-R2) \le -0.90$.

An on-axis thickness of the first lens L1 is defined as d1, the total track length of the camera optical lens 10 is defined as TTL, and the camera optical lens satisfies a condition of $0.02 \le d1/TTL \le 0.06$. Within this range, it is beneficial to implementing miniature camera optical lens. As an improvement, the camera optical lens satisfies a condition of $0.02 \le d1/TTL \le 0.05$.

An object side surface of the second lens L2 is convex in a paraxial region, an image side surface of the second lens is concave in the paraxial region, and the second lens L2 has a positive refractive power. The object side surface and the image side surface of the second lens L2 may also be set to other concave or convex distribution situations.

The focal length of the camera optical lens is defined as f, the focal length of the second lens L2 is defined as f2, and the camera optical lens satisfies a condition of $1.50 \le f2/f \le 11.95$. By controlling the positive refractive power of the second lens L2 within a reasonable range, it is beneficial to correcting an aberration of the optical system. As an improvement, the camera optical lens satisfies a condition of $2.40 \le f2/f \le 9.56$.

A curvature radius of the object side surface of the second lens L2 is defined as R3, a curvature radius of the image side surface of the second lens L2 is defined as R4, and the camera optical lens satisfies a condition of $-54.86 \le (R3+R4)/(R3-R4) \le -4.92$, which stipulates a shape of the second lens L2. Within this range, a development towards ultra-thin and wide-angle lenses would facilitate correcting a problem of an on-axis aberration. As an improvement, the camera optical lens satisfies a condition of $-34.29 \le (R3+R4)/(R3-R4) \le -6.15$.

An on-axis thickness of the second lens L2 is defined as d3, the total track length of the camera optical lens 10 is defined as TTL, and the camera optical lens satisfies a condition of $0.03 \le d3/TTL \le 0.11$. Within this range, it is beneficial to implementing miniature camera optical lens. As an improvement, the camera optical lens satisfies a condition of $0.05 \le d3/TTL \le 0.09$.

An object side surface of the third lens L3 is convex in a paraxial region, an image side surface of the third lens is convex in the paraxial region, and the third lens L3 has a positive refractive power. The object side surface and the image side surface of the third lens L3 may also be set to other concave or convex distribution situations.

The focal length of the camera optical lens is defined as f, the focal length of the third lens L3 is defined as f3, and the camera optical lens satisfies a condition of $0.57 \le f3/f \le 1.79$. By a reasonable allocation of the focal lengths, the system can have an excellent imaging quality and a lower sensitivity. As an improvement, the camera optical lens satisfies a condition of $0.92 \le f3/f \le 1.44$.

A curvature radius of the object side surface of the third lens L3 is defined as R5, a curvature radius of an image side surface of the third lens L3 is defined as R6, and the camera optical lens satisfies a condition of $0.11 \le (R5+R6)/(R5-R6) \le 0.37$. Within this range, a shape of the third lens L3 can be effectively controlled, which is beneficial for the formation of the third lens L3 and to preventing poor formation and generation of stress due to excessive surface curvature of the third lens L3. As an improvement, the camera optical lens satisfies a condition of $0.18 \le (R5+R6)/(R5-R6) \le 0.29$.

The on-axis thickness of the third lens L3 is defined as d5, the total track length of the camera optical lens 10 is defined as TTL, and the camera optical lens satisfies a condition of $0.06 \le d5/TTL \le 0.18$. Within this range, it is beneficial to implementing miniature camera optical lens. As an improvement, the camera optical lens satisfies a condition of $0.09 \le d5/TTL \le 0.14$.

The object side surface of the fourth lens L4 is convex in a paraxial region, the image side surface of the fourth lens L4 is concave in the paraxial region, and the fourth lens L4 has a negative refractive power. The object side surface and the image side surface of the fourth lens L4 may also be set to other concave or convex distribution situations.

The focal length of the camera optical lens is defined as f, a focal length of the fourth lens L4 is defined as f4, and the camera optical lens satisfies a condition of $-9.47 \le f4/f \le -2.92$. By a reasonable allocation of the focal lengths, the system can have an excellent imaging quality and a lower sensitivity. As an improvement, the camera optical lens satisfies a condition of $-5.92 \le f4/f \le -3.65$.

The on-axis thickness of the fourth lens L4 is defined as d7, the total track length of the camera optical lens 10 is defined as TTL, and the camera optical lens satisfies a condition of $0.03 \le d7/TTL \le 0.09$. Within this range, it is beneficial to implementing miniature camera optical lens. As an improvement, the camera optical lens satisfies a condition of 0.04≤d7/TTL≤0.07.

An object side surface of the fifth lens L5 is concave in a paraxial region, an image side surface of the fifth lens is convex in the paraxial region, and the fifth lens L5 has a positive refractive power. The object side surface and the image side surface of the fifth lens L5 may also be set to other concave or convex distribution situations.

The focal length of the camera optical lens is defined as f, a focal length of the fifth lens L5 is defined as f5, and the camera optical lens satisfies a condition of 0.29≤f5/f≤0.89. By defining the fifth lens L5, a light angle for the camera optical lens 10 can be smoothed effectively and a tolerance sensitivity can be reduced. As an improvement, the camera optical lens satisfies a condition of 0.46≤f5/f≤0.71.

A curvature radius of the object side surface of the fifth lens L5 is defined as R9, a curvature radius of the image side surface of the fifth lens L5 is defined as R10, and the camera optical lens satisfies a condition of 0.83≤(R9+R10)/(R9−R10)≤2.60, which stipulates a shape of the fifth lens L5. Within this range, a development towards ultra-thin and wide-angle lenses would facilitate correcting a problem of an off-axis aberration. As an improvement, the camera optical lens satisfies a condition of 1.33≤(R9+R10)/(R9−R10)≤2.08.

The on-axis thickness of the fifth lens L5 is defined as d9, the total track length of the camera optical lens 10 is defined as TTL, and the camera optical lens satisfies a condition of 0.09≤d9/TTL≤0.26. Within this range, it is beneficial to implementing miniature camera optical lens. As an improvement, the camera optical lens satisfies a condition of 0.14≤d9/TTL≤0.21.

An object side surface of the sixth lens L6 is convex in a paraxial region, an image side surface of the sixth lens is concave in the paraxial region, and the sixth lens L6 has a negative refractive power. The object side surface and the image side surface of the sixth lens L6 may also be set to other concave or convex distribution situations.

The focal length of the camera optical lens is defined as f, the focal length of the sixth lens L6 is defined as f6, and the camera optical lens satisfies a condition of −1.44≤f6/f≤−0.48. By a reasonable allocation of the focal lengths, the system can have an excellent imaging quality and a lower sensitivity. As an improvement, the camera optical lens satisfies a condition of −0.90≤f6/f≤−0.59.

A curvature radius of the object side surface of the sixth lens L6 is defined as R11, a curvature radius of the image side surface of the sixth lens L6 is defined as R12, and the camera optical lens satisfies a condition of 0.89≤(R11+R12)/(R11−R12)≤2.74, which stipulates a shape of the sixth lens L6. Within this range, a development towards ultra-thin and wide-angle lenses would facilitate correcting a problem of an off-axis aberration. As an improvement, the camera optical lens satisfies a condition of 1.42≤(R11+R12)/(R11−R12)≤2.19.

The on-axis thickness of the sixth lens L6 is defined as d11, the total track length of the camera optical lens 10 is defined as TTL, and the camera optical lens satisfies a condition of 0.04≤d11/TTL≤0.13. Within this range, it is beneficial to implementing miniature camera optical lens. As an improvement, the camera optical lens satisfies a condition of 0.07≤d11/TTL≤0.11.

An image height of the camera optical lens is defined as IH, the total track length of the camera optical lens 10 is defined as TTL, and the camera optical lens satisfies a condition of TTL/IH≤2.39, which is beneficial to implementing ultra-thin. As an improvement, the camera optical lens satisfies a condition of TTL/IH≤1.91.

A field of view of the camera optical lens is defined as FOV, and the camera optical lens satisfies a condition of FOV≥100.00°, it is facilitate to implementing wide-angle.

A F number of the camera optical lens is defined as FNO, and the camera optical lens satisfies a condition of FNO≤2.26. In this way, the camera optical lens can have a large aperture and a good imaging performance. As an improvement, the camera optical lens satisfies a condition of FNO≤2.22.

In the following, embodiments will be used to describe the camera optical lens of the present disclosure. The symbols recorded in each embodiment will be described as follows. The focal length, on-axis distance, curvature radius, on-axis thickness, inflexion point position, and arrest point position are all in units of mm.

TTL: total track length (the on-axis distance from the object side surface of the first lens L1 to the image surface Si of the camera optical lens along the optical axis) in mm.

The F number (FNO) refers to a ratio of an effective focal length of the camera optical lens to an entrance pupil diameter (ENPD).

Preferably, the object side surface and the image side surface of the lens may have inflexion points and/or arrest points, so as to satisfy the demand for high quality imaging.

In the following, the technical solutions of the present disclosure are illustrated in detail with reference to four embodiments, and at the same time, a comparative example is provided as a reference. The technical effect of the present disclosure cannot be achieved beyond the scope of the conditions as illustrated above.

First Embodiment

Table 1 and Table 2 show design data of the camera optical lens 10 according to the first embodiment of the present disclosure.

TABLE 1

|  | R | d |  | nd |  | vd |  |
|---|---|---|---|---|---|---|---|
| R1 | −2.165 | d1= | 0.255 | nd1 | 1.5444 | v1 | 56.00 |
| R2 | −13.257 | d2= | 0.148 |  |  |  |  |
| R3 | 1.248 | d3= | 0.270 | nd2 | 1.5876 | v2 | 29.00 |
| R4 | 1.400 | d4= | 0.283 |  |  |  |  |
| S1 | ∞ | ds= | −0.024 |  |  |  |  |
| R5 | 3.116 | d5= | 0.471 | nd3 | 1.5444 | v3 | 56.00 |
| R6 | −1.959 | d6= | 0.144 |  |  |  |  |
| R7 | 6.254 | d7= | 0.233 | nd4 | 1.6610 | v4 | 20.53 |
| R8 | 2.992 | d8= | 0.262 |  |  |  |  |
| R9 | −2.156 | d9= | 0.688 | nd5 | 1.5444 | v5 | 56.00 |
| R10 | −0.545 | d10= | 0.040 |  |  |  |  |
| R11 | 1.891 | d11= | 0.354 | nd6 | 1.6153 | v6 | 26.00 |
| R12 | 0.554 | d12= | 0.596 |  |  |  |  |
| R13 | ∞ | d13= | 0.110 | ndg | 1.5168 | vg | 64.17 |
| R14 | ∞ | d14= | 0.448 |  |  |  |  |

Herein, meanings of various symbols will be described as follows.

S1: aperture.

R: curvature radius of an optical surface, a central curvature radius for a lens.

R1: curvature radius of the object side surface of the first lens L1.

R2: curvature radius of the image side surface of the first lens L1.

R3: curvature radius of the object side surface of the second lens L2.

R4: curvature radius of the image side surface of the second lens L2.

R5: curvature radius of the object side surface of the third lens L3.

R6: curvature radius of the image side surface of the third lens L3.

R7: curvature radius of the object side surface of the fourth lens L4.

R8: curvature radius of the image side surface of the fourth lens L4.

R9: curvature radius of the object side surface of the fifth lens L5.

R10: curvature radius of the image side surface of the fifth lens L5.

R11: curvature radius of the object side surface of the sixth lens L6.

R12: curvature radius of the image side surface of the sixth lens L6.

R13: curvature radius of an object side surface of the optical filter (GF).

R14: curvature radius of an image side surface of the optical filter (GF).

d: on-axis thickness of a lens and an on-axis distance between lenses.

d1: on-axis thickness of the first lens L1.

d2: on-axis distance from the image side surface of the first lens L1 to the object side surface of the second lens L2.

d3: on-axis thickness of the second lens L2.

d4: on-axis distance from the image side surface of the second lens L2 to the aperture S1.

ds: on-axis distance from the aperture S1 to the object side surface of the third lens L3.

d5: on-axis thickness of the third lens L3.

d6: on-axis distance from the image side surface of the third lens L3 to the object side surface of the fourth lens L4.

d7: on-axis thickness of the fourth lens L4.

d8: on-axis distance from the image side surface of the fourth lens L4 to the object side surface of the fifth lens L5.

d9: on-axis thickness of the fifth lens L5.

d10: on-axis distance from the image side surface of the fifth lens L5 to the object side surface of the sixth lens L6.

d11: on-axis thickness of the sixth lens L6.

d12: on-axis distance from the image side surface of the sixth lens L6 to the object side surface of the optical filter (GF).

d13: on-axis thickness of the optical filter (GF).

d14: on-axis distance from the image side surface of the optical filter (GF) to the image surface Si.

nd: refractive index of a d line (the d line refers to green light with a wavelength of 550 nm).

nd1: refractive index of the d line of the first lens L1.

nd2: refractive index of the d line of the second lens L2.

nd3: refractive index of the d line of the third lens L3.

nd4: refractive index of the d line of the fourth lens L4.

nd5: refractive index of the d line of the fifth lens L5.

nd6: refractive index of the d line of the sixth lens L6.

ndg: refractive index of the d line of the optical filter (GF).

vd: abbe number.

v1: abbe number of the first lens L1.

v2: abbe number of the second lens L2.

v3: abbe number of the third lens L3.

v4: abbe number of the fourth lens L4.

v5: abbe number of the fifth lens L5.

V6: abbe number of the sixth lens L6.

vg: abbe number of the optical filter (GF).

Table 2 shows aspherical surface data of each lens of the camera optical lens 10 in the First Embodiment of the present disclosure.

TABLE 2

| | Conic coefficient | Aspheric surface coefficients | | | | |
| --- | --- | --- | --- | --- | --- | --- |
| | k | A4 | A6 | A8 | A10 | A12 |
| R1 | −4.8154E+01 | 5.6403E−01 | −8.7246E−01 | 1.0104E+00 | −3.3790E−01 | −1.0125E+00 |
| R2 | 9.9000E+01 | 1.5489E+00 | −5.4330E+00 | 2.0861E+01 | −6.7077E+01 | 1.6223E+02 |
| R3 | −3.4155E+00 | 4.4573E−01 | −3.2201E+00 | 1.4299E+01 | −4.9880E+01 | 1.0997E+02 |
| R4 | 3.6145E+00 | −2.7705E−01 | −3.6407E−01 | −4.4214E+00 | 1.0130E+02 | −1.0579E+03 |
| R5 | 2.8836E+00 | 1.5098E−02 | −9.1929E−01 | 1.9075E+01 | −2.3092E+02 | 1.6794E+03 |
| R6 | 1.2266E+00 | −5.1375E−01 | 1.2845E+00 | −4.3829E+00 | 4.5948E+00 | 5.9789E+01 |
| R7 | 3.6232E+01 | −8.5834E−01 | 2.2588E+00 | −1.2601E+01 | 5.7063E+01 | −1.5933E+02 |
| R8 | −1.3930E+00 | −4.0698E−01 | 9.4368E−01 | −3.0260E+00 | 9.5323E+00 | −2.0727E+01 |
| R9 | −8.8345E−01 | 7.4188E−03 | 2.4574E−01 | −6.2657E−01 | 1.4810E+00 | 2.2704E−01 |
| R10 | −1.1859E+00 | 1.4370E+00 | −6.2369E+00 | 1.8818E+01 | −3.8942E+01 | 5.3984E+01 |
| R11 | −3.7727E+00 | −1.0219E−01 | −2.4914E−01 | 6.3931E−01 | −7.6787E−01 | 5.4699E−01 |
| R12 | −5.6596E+00 | −7.5625E−02 | −4.0208E−02 | 1.1131E−01 | −1.0455E−01 | 5.5132E−02 |

| | Conic coefficient | Aspheric surface coefficients | | | |
| --- | --- | --- | --- | --- | --- |
| | k | A14 | A16 | A18 | A20 |
| R1 | −4.8154E+01 | 1.8855E+00 | −1.5202E+00 | 6.1219E−01 | −9.8521E−02 |
| R2 | 9.9000E+01 | −2.7619E+02 | 3.1315E+02 | −2.1733E+02 | 7.1272E+01 |
| R3 | −3.4155E+00 | −1.1459E+02 | −4.7400E+01 | 2.3821E+02 | −1.6440E+02 |
| R4 | 3.6145E+00 | 6.1151E+03 | −2.0237E+04 | 3.5867E+04 | −2.6410E+04 |
| R5 | 2.8836E+00 | −7.4709E+03 | 1.9823E+04 | −2.8724E+04 | 1.7396E+04 |
| R6 | 1.2266E+00 | −4.1769E+02 | 1.2621E+03 | −1.9073E+03 | 1.1595E+03 |
| R7 | 3.6232E+01 | 2.2336E+02 | −4.3529E+01 | −2.4931E+02 | 2.0503E+02 |
| R8 | −1.3930E+00 | 2.7261E+01 | −1.9927E+01 | 6.7878E+00 | −6.1089E−01 |
| R9 | −8.8345E−01 | −6.4852E+00 | 1.0154E+01 | −6.2871E+00 | 1.3716E+00 |
| R10 | −1.1859E+00 | −4.8234E+01 | 2.6524E+01 | −8.1686E+00 | 1.0795E+00 |
| R11 | −3.7727E+00 | −2.4037E−01 | 6.3989E−02 | −9.4742E−03 | 5.9937E−04 |
| R12 | −5.6596E+00 | −1.7651E−02 | 3.4071E−03 | −3.6589E−04 | 1.6840E−05 |

For convenience, an aspheric surface of each lens surface uses the aspheric surfaces as expressed in the following condition (1). However, the present disclosure is not limited to the aspherical polynomials form as expressed in the condition (1).

$$z = (cr^2)/\{1 + [1 - (k + 1)(c^2 r^2)]^{1/2}\} + A4r^4 + A6r^6 + \qquad (1)$$
$$A8r^8 + A10r^{10} + A12r^{12} + A14r^{14} + A16r^{16} + A18r^{18} + A20r^{20}$$

Herein, K is a conic coefficient, A4, A6, A8, A10, A12, A14, A16, A18, and A20 are aspheric surface coefficients, c is a curvature of an optical surface or a central curvature for a lens, r is a vertical distance between a point on an aspheric curve and the optical axis, and z is a depth of the aspheric surface (the vertical distance between a point on the aspheric surface from which a vertical distance to the optical axis is r and a tangent plane tangent to a vertex on the optical axis of the aspheric surface).

Table 3 and Table 4 show design data of inflexion points and arrest points of the lenses of the camera optical lens 10 according to the First Embodiment of the present disclosure. Herein P1R1 and P1R2 represent the object side surface and the image side surface of the first lens L1, P2R1 and P2R2 represent the object side surface and the image side surface of the second lens L2, P3R1 and P3R2 represent the object side surface and the image side surface of the third lens L3, P4R1 and P4R2 represent the object side surface and the image side surface of the fourth lens L4, P5R1 and P5R2 represent the object side surface and the image side surface of the fifth lens L5, P6R1 and P6R2 represent the object side surface and the image side surface of the sixth lens L6. The data in the column named "inflexion point position" refer to vertical distances from inflexion points arranged on surfaces of each lens to the optical axis of the camera optical lens 10. The data in the column named "arrest point position" refer to vertical distances from arrest points arranged on surfaces of each lens to the optical axis of the camera optical lens 10.

TABLE 3

| | Number of inflexion points | Inflexion point position 1 | Inflexion point position 2 | Inflexion point position 3 |
|---|---|---|---|---|
| P1R1 | 1 | 0.215 | / | / |
| P1R2 | 1 | 0.055 | / | / |
| P2R1 | 3 | 0.515 | 0.715 | 0.725 |
| P4R1 | 1 | 0.145 | / | / |
| P4R2 | 1 | 0.345 | / | / |
| P5R1 | 2 | 0.575 | 0.865 | / |
| P5R2 | 1 | 0.765 | / | / |
| P6R1 | 1 | 0.485 | / | / |
| P6R2 | 1 | 0.475 | / | / |

TABLE 4

| | Number of arrest points | Arrest point positions 1 |
|---|---|---|
| P1R1 | 1 | 0.425 |
| P1R2 | 1 | 0.085 |
| P4R1 | 1 | 0.245 |
| P4R2 | 1 | 0.755 |

TABLE 4-continued

| | Number of arrest points | Arrest point positions 1 |
|---|---|---|
| P6R1 | 1 | 0.955 |
| P6R2 | 1 | 1.355 |

Figure 3:
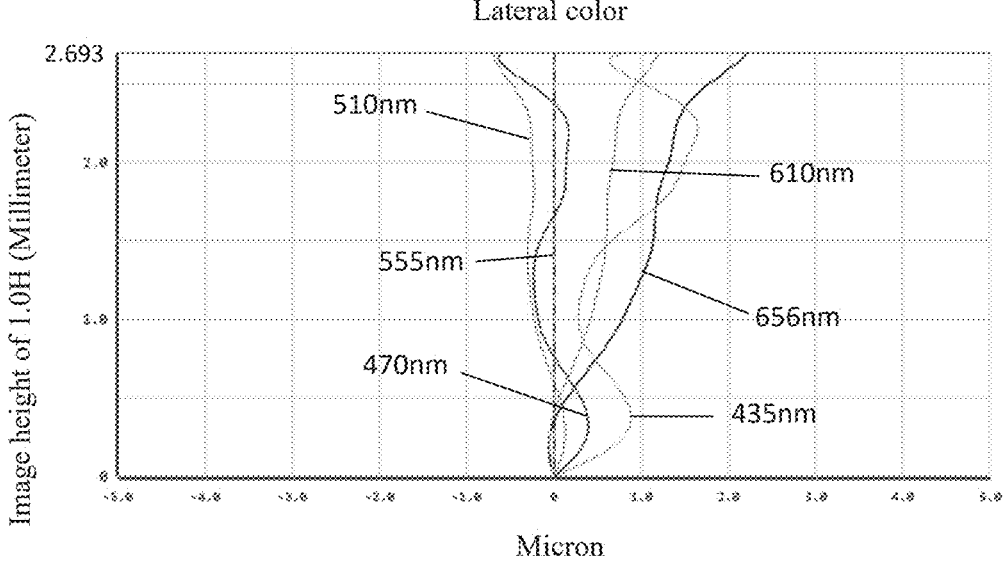
FIG. 3 is a schematic diagram of a lateral color of the camera optical lens shown in FIG. 1.
Figure 4:
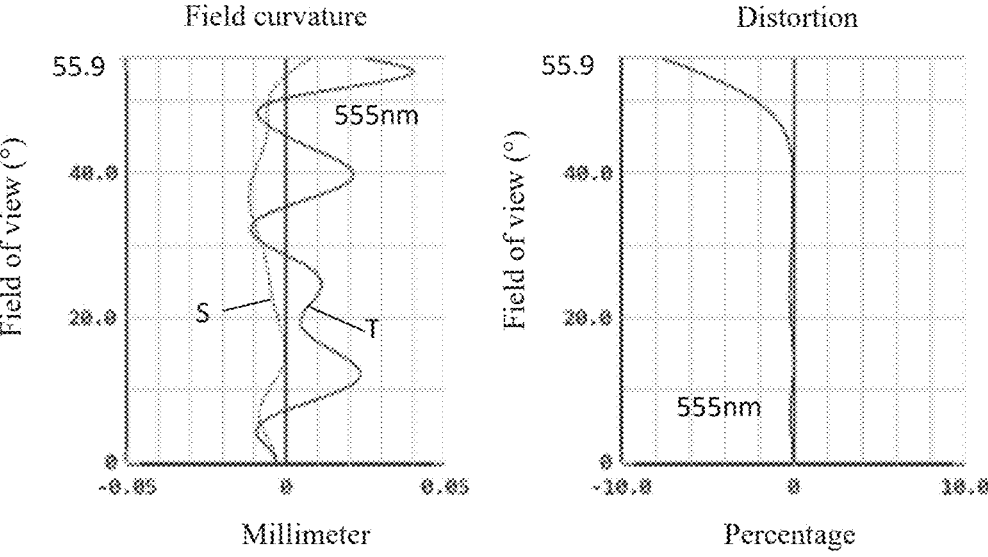
FIG. 4 is a schematic diagram of a field curvature and a distortion of the camera optical lens shown in FIG. 1.

FIG. 2 and FIG. 3 illustrate a longitudinal aberration and a lateral color of the camera optical lens 10 according to the First Embodiment after light with wavelengths of 656 nm, 610 nm, 555 nm, 510 nm, 470 nm and 435 nm passing through the camera optical lens 10, respectively. FIG. 4 illustrates a field curvature and a distortion of the camera optical lens 10 after light with a wavelength of 555 nm passing through the camera optical lens 10 according to the First Embodiment. A field curvature S in FIG. 4 is a field curvature in a sagittal direction, and T is a field curvature in a tangential direction.

In the embodiment, an entrance pupil diameter (ENPD) of the camera optical lens 10 is 0.897 mm, an image height IH of 1.0H is 2.693 mm, a field of view FOV in a diagonal direction is 111.80°. Thus, the camera optical lens can meet the design requirements of a large aperture, a wide angle and ultra-thin, and its on-axis and off-axis chromatic aberrations are fully corrected, thereby achieving excellent optical characteristics.

Second Embodiment

The symbols in the Second Embodiment have the same meanings as those in the First Embodiment.

Figure 5:
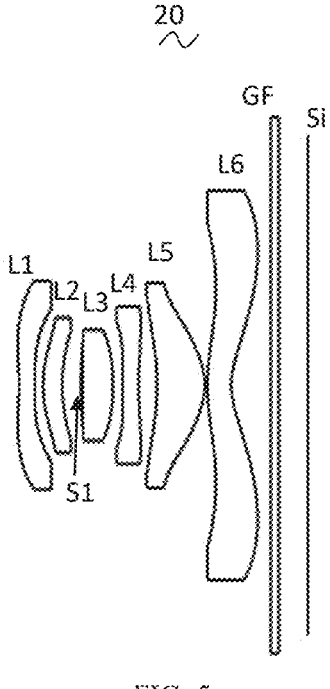
FIG. 5 is a schematic diagram of a structure of a camera optical lens according to a second embodiment of the present disclosure.

FIG. 5 shows the camera optical lens 20 according to the Second Embodiment of the present disclosure.

Table 5 and Table 6 show design data of a camera optical lens 20 according to the Second Embodiment of the present disclosure.

TABLE 5

| | R | d | | nd | | vd | |
|---|---|---|---|---|---|---|---|
| R1 | −1.879 | d1= | 0.229 | nd1 | 1.5444 | v1 | 56.00 |
| R2 | −46.974 | d2= | 0.121 | | | | |
| R3 | 1.078 | d3= | 0.281 | nd2 | 1.5876 | v2 | 29.00 |
| R4 | 1.416 | d4= | 0.293 | | | | |
| S1 | ∞ | ds= | −0.022 | | | | |
| R5 | 3.247 | d5= | 0.470 | nd3 | 1.5444 | v3 | 56.00 |
| R6 | −1.972 | d6= | 0.141 | | | | |
| R7 | 6.837 | d7= | 0.237 | nd4 | 1.6610 | v4 | 20.53 |
| R8 | 3.100 | d8= | 0.269 | | | | |
| R9 | −2.192 | d9= | 0.696 | nd5 | 1.5444 | v5 | 56.00 |
| R10 | −0.543 | d10= | 0.040 | | | | |
| R11 | 1.888 | d11= | 0.347 | nd6 | 1.6153 | v6 | 26.00 |
| R12 | 0.553 | d12= | 0.583 | | | | |
| R13 | ∞ | d13= | 0.110 | ndg | 1.5168 | vg | 64.17 |
| R14 | ∞ | d14= | 0.434 | | | | |

Table 6 shows aspherical surface data of each lens of the camera optical lens 20 in the Second Embodiment of the present disclosure.

TABLE 6

| | Conic coefficient | Aspheric surface coefficients | | | | |
|---|---|---|---|---|---|---|
| | k | A4 | A6 | A8 | A10 | A12 |
| R1 | −3.8699E+01 | 5.7281E−01 | −9.5623E−01 | 1.1697E+00 | −4.4408E−01 | −1.1286E+00 |
| R2 | 9.9000E+01 | 1.4955E+00 | −5.5489E+00 | 2.0609E+01 | −6.0709E+01 | 1.2725E+02 |
| R3 | −3.7344E+00 | 3.7673E−01 | −2.4688E+00 | 1.0184E+01 | −3.9554E+01 | 1.1203E+02 |
| R4 | 3.6053E+00 | −2.9266E−01 | 4.9311E−01 | −1.6355E+01 | 2.1080E+02 | −1.7013E+03 |
| R5 | 1.8398E+00 | −1.3422E−02 | 3.5151E−01 | −8.6970E+00 | 1.1835E+02 | −1.0485E+03 |
| R6 | 1.2207E+00 | −4.4249E−01 | 8.8313E−01 | −3.6727E+00 | 1.3721E+00 | 1.2724E+02 |
| R7 | 3.8833E+01 | −7.3300E−01 | 8.6403E−01 | 1.2975E−01 | −2.8632E+01 | 2.2197E+02 |
| R8 | −2.3306E+00 | −3.6759E−01 | 5.9764E−01 | −1.3198E+00 | 2.5034E+00 | 6.3238E−01 |
| R9 | −2.4247E−01 | 1.1164E−03 | 3.3433E−01 | −1.1659E+00 | 2.7016E+00 | −1.8431E+00 |
| R10 | −1.2013E+00 | 1.4104E+00 | −5.9620E+00 | 1.7421E+01 | −3.4460E+01 | 4.5130E+01 |
| R11 | −3.5146E+00 | −1.0636E−01 | −1.6919E−01 | 4.7091E−01 | −5.7291E−01 | 4.0906E−01 |
| R12 | −5.2189E+00 | −6.0449E−02 | −2.7468E−02 | 7.1627E−02 | −6.4142E−02 | 3.2282E−02 |

| | Conic coefficient | Aspheric surface coefficients | | | |
|---|---|---|---|---|---|
| | k | A14 | A16 | A18 | A20 |
| R1 | −3.8699E+01 | 2.1888E+00 | −1.7825E+00 | 7.2140E−01 | −1.1715E−01 |
| R2 | 9.9000E+01 | −1.7696E+02 | 1.5339E+02 | −7.6806E+01 | 1.8321E+01 |
| R3 | −3.7344E+00 | −2.0443E+02 | 2.0855E+02 | −8.2495E+01 | −8.2229E+00 |
| R4 | 3.6053E+00 | 8.4059E+03 | −2.4727E+04 | 3.9709E+04 | −2.6790E+04 |
| R5 | 1.8398E+00 | 5.9089E+03 | −2.0364E+04 | 3.8914E+04 | −3.1520E+04 |
| R6 | 1.2207E+00 | −9.2277E+02 | 3.0111E+03 | −4.8436E+03 | 3.0991E+03 |
| R7 | 3.8833E+01 | −8.4940E+02 | 1.7868E+03 | −1.9754E+03 | 8.9631E+02 |
| R8 | −2.3306E+00 | −1.4940E+01 | 3.0525E+01 | −2.6333E+01 | 8.5729E+00 |
| R9 | −2.4247E−01 | −2.9791E+00 | 6.0484E+00 | −3.8870E+00 | 8.6909E−01 |
| R10 | −1.2013E+00 | −3.7671E+01 | 1.9131E+01 | −5.3798E+00 | 6.4244E−01 |
| R11 | −3.5146E+00 | −1.7899E−01 | 4.7179E−02 | −6.8807E−03 | 4.2661E−04 |
| R12 | −5.2189E+00 | −9.7692E−03 | 1.7573E−03 | −1.7296E−04 | 7.1636E−06 |

Table 7 and Table 8 show design data of inflexion points and arrest points of the lenses of the camera optical lens 20 according to the Second Embodiment of the present disclosure.

TABLE 7

| | Number of inflexion points | Inflexion point positions 1 | Inflexion point positions 2 |
|---|---|---|---|
| P1R1 | 1 | 0.225 | / |
| P1R2 | 1 | 0.035 | / |
| P2R1 | 2 | 0.505 | 0.715 |
| P4R1 | 1 | 0.135 | / |
| P4R2 | 1 | 0.325 | / |
| P5R1 | 2 | 0.595 | 0.845 |
| P5R2 | 2 | 0.765 | 1.135 |
| P6R1 | 1 | 0.525 | / |
| P6R2 | 1 | 0.505 | / |

TABLE 8

| | Number of arrest points | Arrest point positions 1 |
|---|---|---|
| P1R1 | 1 | 0.455 |
| P1R2 | 1 | 0.065 |
| P4R1 | 1 | 0.235 |
| P4R2 | 1 | 0.675 |
| P6R1 | 1 | 1.085 |
| P6R2 | 1 | 1.495 |

Figure 6:
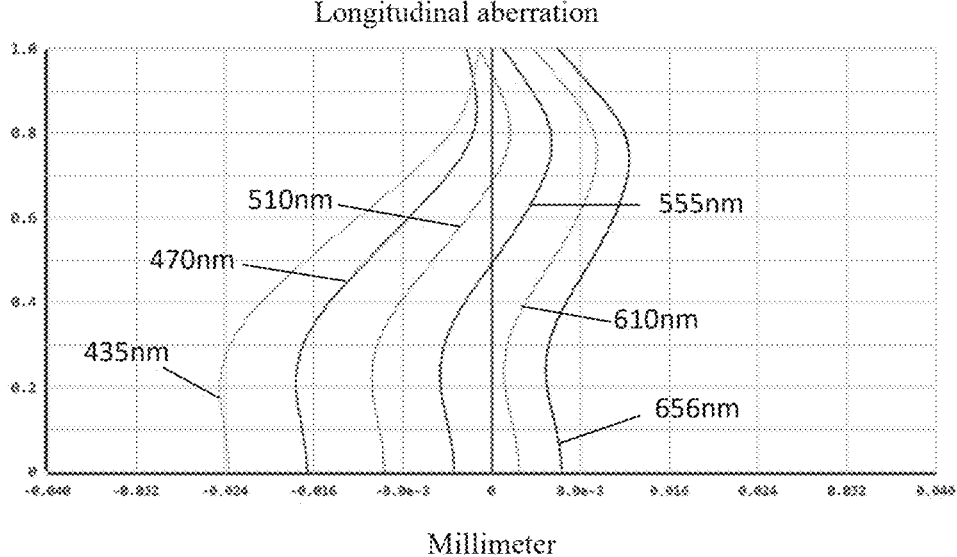
FIG. 6 is a schematic diagram of a longitudinal aberration of the camera optical lens shown in FIG. 5.
Figure 7:
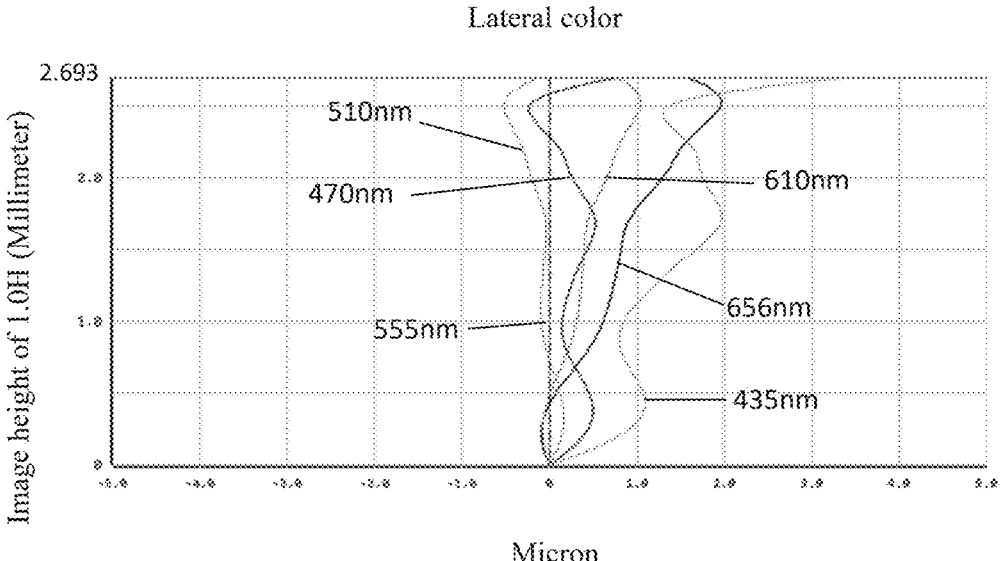
FIG. 7 is a schematic diagram of a lateral color of the camera optical lens shown in FIG. 5.
Figure 8:
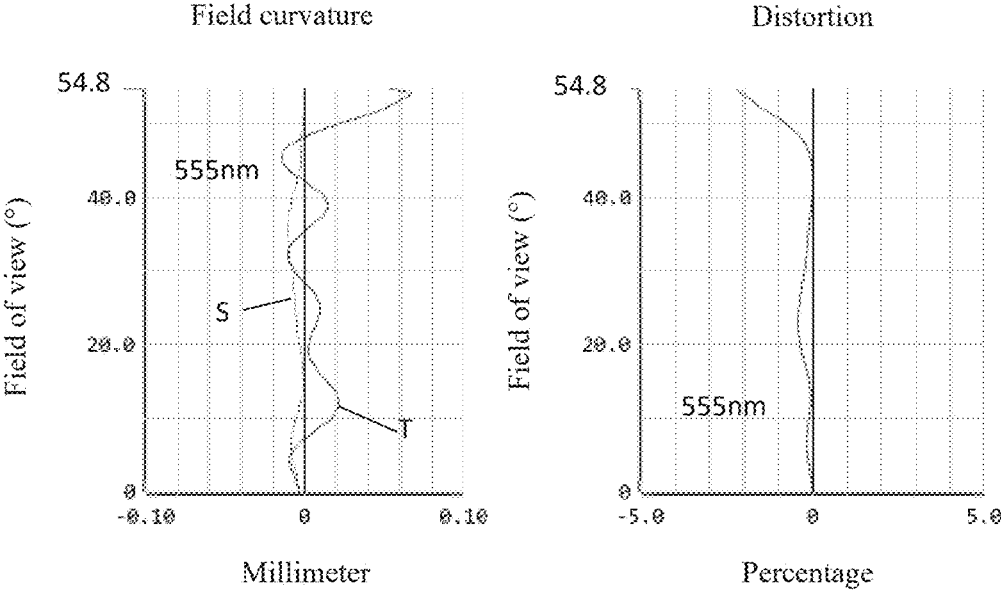
FIG. 8 is a schematic diagram of a field curvature and a distortion of the camera optical lens shown in FIG. 5.

FIG. 6 and FIG. 7 illustrate a longitudinal aberration and a lateral color of the camera optical lens 20 according to the Second Embodiment after light with wavelengths of 656 nm, 610 nm, 555 nm, 510 nm, 470 nm and 435 nm passing through the camera optical lens 20, respectively. FIG. 8 illustrates a field curvature and a distortion of the camera optical lens 20 after light with a wavelength of 555 nm passing through the camera optical lens 20 according to the Second Embodiment. A field curvature S in FIG. 8 is a field curvature in a sagittal direction, and T is a field curvature in a tangential direction.

In the embodiment, an entrance pupil diameter (ENPD) of the camera optical lens 20 is 0.884 mm, an image height IH of 1.0H is 2.693 mm, a field of view FOV in a diagonal direction is 109.60°. Thus, the camera optical lens 20 can meet the design requirements of a large aperture, a wide angle and ultra-thin, and its on-axis and off-axis chromatic aberrations are fully corrected, thereby achieving excellent optical characteristics.

Third Embodiment

The symbols in the Third Embodiment have the same meanings as those in the First Embodiment.

Figures 9, 10:
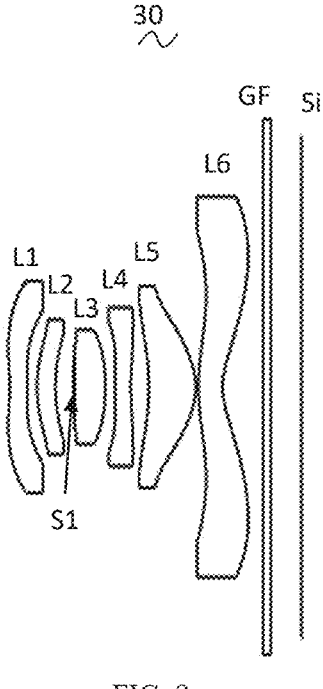
FIG. 9 is a schematic diagram of a structure of a camera optical lens according to a third embodiment of the present disclosure.
FIG. 10 is a schematic diagram of a longitudinal aberration of the camera optical lens shown in FIG. 9.

FIG. 9 shows the camera optical lens 30 according to the Third Embodiment of the present disclosure.

Table 9 and Table 10 show design data of a camera optical lens 30 according to the Third Embodiment of the present disclosure.

TABLE 9

| | R | | d | | nd | | vd |
|---|---|---|---|---|---|---|---|
| R1 | −2.165 | d1= | 0.255 | nd1 | 1.5444 | v1 | 56.00 |
| R2 | −13.257 | d2= | 0.148 | | | | |
| R3 | 1.248 | d3= | 0.270 | nd2 | 1.5876 | v2 | 29.00 |
| R4 | 1.400 | d4= | 0.283 | | | | |
| S1 | ∞ | ds= | −0.024 | | | | |
| R5 | 3.116 | d5= | 0.471 | nd3 | 1.5444 | v3 | 56.00 |
| R6 | −1.959 | d6= | 0.144 | | | | |
| R7 | 6.254 | d7= | 0.233 | nd4 | 1.6610 | v4 | 20.53 |
| R8 | 2.992 | d8= | 0.262 | | | | |
| R9 | −2.156 | d9= | 0.688 | nd5 | 1.5444 | v5 | 56.00 |
| R10 | −0.545 | d10= | 0.040 | | | | |

TABLE 9-continued

| | R | d | | nd | | vd |
|---|---|---|---|---|---|---|
| R11 | 1.891 | d11= | 0.354 | nd6 | 1.6153 | v6 | 26.00 |
| R12 | 0.554 | d12= | 0.596 | | | |
| R13 | ∞ | d13= | 0.110 | ndg | 1.5168 | vg | 64.17 |
| R14 | ∞ | d14= | 0.448 | | | |

Table 10 shows aspherical surface data of each lens of the camera optical lens 30 in the Third Embodiment of the present disclosure.

TABLE 10

| | Conic coefficient | Aspheric surface coefficients | | | | |
|---|---|---|---|---|---|---|
| | k | A4 | A6 | A8 | A10 | A12 |
| R1 | −4.0239E+01 | 5.6439E−01 | −9.3316E−01 | 1.2703E+00 | −1.0184E+00 | 1.1708E−01 |
| R2 | 9.9000E+01 | 1.4550E+00 | −4.7730E+00 | 1.7688E+01 | −5.7108E+01 | 1.3824E+02 |
| R3 | −3.6099E+00 | 4.1849E−01 | −2.7291E+00 | 1.1527E+01 | −4.7927E+01 | 1.5281E+02 |
| R4 | 3.5925E+00 | −2.5157E−01 | −2.0450E−01 | −9.6116E+00 | 1.5884E+02 | −1.4281E+03 |
| R5 | 9.5113E−01 | −7.1742E−03 | −4.0194E−02 | 7.2471E−01 | −2.3483E+01 | 2.4855E+02 |
| R6 | 1.2115E+00 | −4.4675E−01 | 1.0957E+00 | −7.0937E+00 | 3.4398E+01 | −8.4494E+01 |
| R7 | 4.1136E+01 | −7.5376E−01 | 1.3169E+00 | −5.8100E+00 | 1.7299E+01 | 6.8679E−01 |
| R8 | −2.0892E+00 | −3.7679E−01 | 7.0120E−01 | −2.0202E+00 | 5.7024E+00 | −8.9526E+00 |
| R9 | −4.3777E−01 | 1.5716E−02 | 2.7093E−01 | −7.4895E−01 | 4.6357E−01 | 5.2311E+00 |
| R10 | −1.1849E+00 | 1.3774E+00 | −5.8205E+00 | 1.7397E+01 | −3.5730E+01 | 4.8954E+01 |
| R11 | −3.7456E+00 | −1.2852E−01 | −1.0935E−01 | 3.6722E−01 | −4.8239E−01 | 3.7329E−01 |
| R12 | −5.2399E+00 | −7.0655E−02 | −1.4086E−02 | 5.9898E−02 | −5.9662E−02 | 3.2949E−02 |

| | Conic coefficient | Aspheric surface coefficients | | | |
|---|---|---|---|---|---|
| | k | A14 | A16 | A18 | A20 |
| R1 | −4.0239E+01 | 6.8322E−01 | −7.2200E−01 | 3.1541E−01 | −5.2028E−02 |
| R2 | 9.9000E+01 | −2.3029E+02 | 2.4641E+02 | −1.5350E+02 | 4.3061E+01 |
| R3 | −3.6099E+00 | −3.3719E+02 | 4.7185E+02 | −3.6306E+02 | 1.1348E+02 |
| R4 | 3.5925E+00 | 7.4919E+03 | −2.2999E+04 | 3.8336E+04 | −2.6838E+04 |
| R5 | 9.5113E−01 | −1.3817E+03 | 4.2318E+03 | −6.7425E+03 | 4.3051E+03 |
| R6 | 1.2115E+00 | −5.2004E+01 | 8.2804E+02 | −1.8210E+03 | 1.3348E+03 |
| R7 | 4.1136E+01 | −1.8645E+02 | 5.9080E+02 | −7.8804E+02 | 3.9931E+02 |
| R8 | −2.0892E+00 | 3.3602E+00 | 9.3473E+00 | −1.2872E+01 | 4.9712E+00 |
| R9 | −4.3777E−01 | −1.6029E+01 | 1.9962E+01 | −1.1807E+01 | 2.7249E+00 |
| R10 | −1.1849E+00 | −4.3090E+01 | 2.3349E+01 | −7.1151E+00 | 9.3748E−01 |
| R11 | −3.7456E+00 | −1.7792E−01 | 5.1188E−02 | −8.1462E−03 | 5.5023E−04 |
| R12 | −5.2399E+00 | −1.0959E−02 | 2.1688E−03 | −2.3480E−04 | 1.0695E−05 |

Table 11 and Table 12 show design data of inflexion points and arrest points of the lenses of the camera optical lens 30 according to the Third Embodiment of the present disclosure.

TABLE 11

| | Number of inflexion points | Inflexion point positions 1 | Inflexion point positions 2 |
|---|---|---|---|
| P1R1 | 1 | 0.225 | / |
| P1R2 | 1 | 0.075 | / |
| P2R1 | 1 | 0.495 | / |
| P4R1 | 1 | 0.145 | / |
| P4R2 | 1 | 0.335 | / |
| P5R1 | 2 | 0.595 | 0.855 |
| P5R2 | 1 | 0.775 | / |
| P6R1 | 1 | 0.515 | / |
| P6R2 | 1 | 0.495 | / |

TABLE 12

| | Number of arrest points | Arrest point positions 1 |
|---|---|---|
| P1R1 | 1 | 0.435 |
| P1R2 | 1 | 0.115 |

TABLE 12-continued

| | Number of arrest points | Arrest point positions 1 |
|---|---|---|
| P4R1 | 1 | 0.245 |
| P4R2 | 1 | 0.715 |
| P6R1 | 1 | 1.025 |
| P6R2 | 1 | 1.465 |

Figure 11:
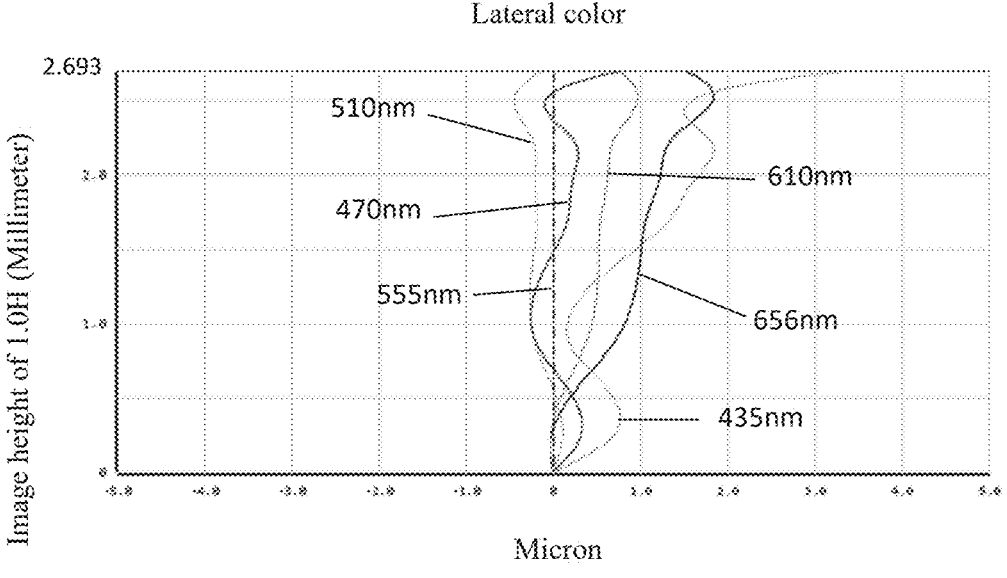
FIG. 11 is a schematic diagram of a lateral color of the camera optical lens shown in FIG. 9.
Figure 12:
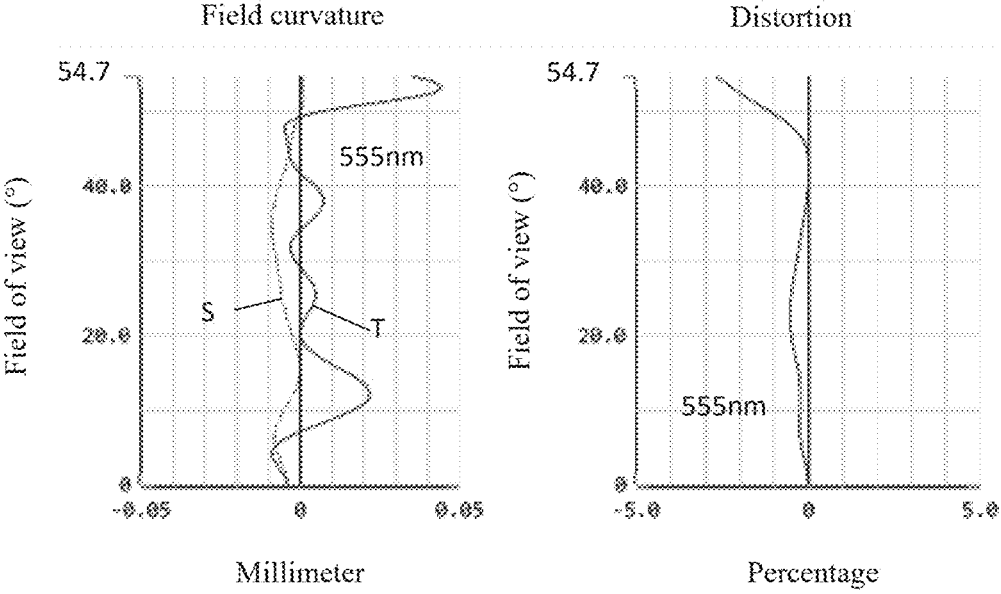
FIG. 12 is a schematic diagram of a field curvature and a distortion of the camera optical lens shown in FIG. 9.

FIG. 10 and FIG. 11 illustrate a longitudinal aberration and a lateral color of the camera optical lens 30 according to the Third Embodiment after light with wavelengths of 656 nm, 610 nm, 555 nm, 510 nm, 470 nm and 435 nm passing through the camera optical lens 30, respectively. FIG. 12 illustrates a field curvature and a distortion of the camera optical lens 30 after light with a wavelength of 555 nm passing through the camera optical lens 30 according to the Third Embodiment. A field curvature S in FIG. 12 is a field curvature in a sagittal direction, and T is a field curvature in a tangential direction.

In the embodiment, an entrance pupil diameter (ENPD) of the camera optical lens 30 is 0.890 mm, an image height IH of 1.0H is 2.693 mm, a field of view FOV in a diagonal direction is 109.46°. Thus, the camera optical lens 30 can meet the design requirements of a large aperture, a wide angle and ultra-thin, and its on-axis and off-axis chromatic aberrations are fully corrected, thereby achieving excellent optical characteristics.

Fourth Embodiment

The symbols in the Fourth Embodiment have the same meanings as those in the First Embodiment.

Figure 13:
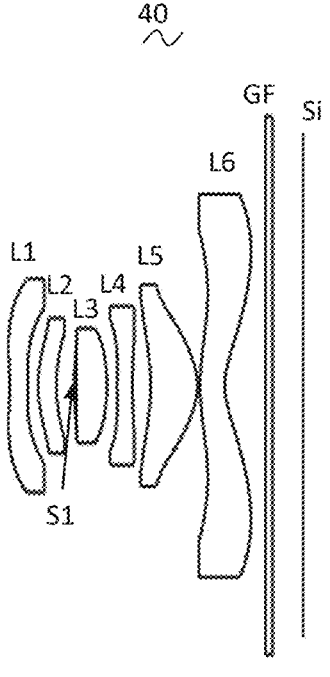
FIG. 13 is a schematic diagram of a structure of a camera optical lens according to a fourth embodiment of the present disclosure.

FIG. 13 shows the camera optical lens 40 according to the Fourth Embodiment of the present disclosure.

Table 13 and Table 14 show design data of a camera optical lens 40 according to the Fourth Embodiment of the present disclosure.

TABLE 13

| | R | d | | nd | | vd |
|---|---|---|---|---|---|---|
| R1 | −2.312 | d1= | 0.265 | nd1 | 1.5444 | v1 | 56.00 |
| R2 | −13.875 | d2= | 0.155 | | | |
| R3 | 1.295 | d3= | 0.265 | nd2 | 1.5876 | v2 | 29.00 |
| R4 | 1.393 | d4= | 0.286 | | | |
| S1 | ∞ | ds= | −0.025 | | | |
| R5 | 3.060 | d5= | 0.476 | nd3 | 1.5444 | v3 | 56.00 |
| R6 | −1.913 | d6= | 0.149 | | | |
| R7 | 6.845 | d7= | 0.226 | nd4 | 1.6610 | v4 | 20.53 |
| R8 | 3.064 | d8= | 0.265 | | | |
| R9 | −2.176 | d9= | 0.686 | nd5 | 1.5444 | v5 | 56.00 |
| R10 | −0.544 | d10= | 0.040 | | | |
| R11 | 1.932 | d11= | 0.360 | nd6 | 1.6153 | v6 | 26.00 |
| R12 | 0.553 | d12= | 0.592 | | | |
| R13 | ∞ | d13= | 0.110 | ndg | 1.5168 | vg | 64.17 |
| R14 | ∞ | d14= | 0.444 | | | |

Table 14 shows aspherical surface data of each lens of the camera optical lens 40 in the Fourth Embodiment of the present disclosure.

TABLE 14

| | Conic coefficient | Aspheric surface coefficients | | | | |
|---|---|---|---|---|---|---|
| | k | A4 | A6 | A8 | A10 | A12 |
| R1 | −4.0399E+01 | 5.6902E−01 | −9.7449E−01 | 1.4548E+00 | −1.5013E+00 | 9.0401E−01 |
| R2 | 9.8984E+01 | 1.3992E+00 | −4.2551E+00 | 1.4109E+01 | −3.9833E+01 | 8.2819E+01 |
| R3 | −3.6672E+00 | 4.2617E−01 | −2.7535E+00 | 1.1322E+01 | −4.6461E+01 | 1.4744E+02 |
| R4 | 3.5584E+00 | −2.4014E−01 | −1.7216E−01 | −1.2878E+01 | 2.0438E+02 | −1.7698E+03 |
| R5 | 5.0334E−01 | −7.4973E−03 | 1.3473E−02 | −1.3802E+00 | 1.1067E+01 | −8.8188E+01 |
| R6 | 1.1748E+00 | −4.3216E−01 | 1.1019E+00 | −8.5763E+00 | 5.1299E+01 | −1.9154E+02 |
| R7 | 4.4318E+01 | −7.4630E−01 | 1.4008E+00 | −7.5968E+00 | 3.1433E+01 | −6.4749E+01 |
| R8 | −2.2202E+00 | −3.7914E−01 | 7.5313E−01 | −2.6044E+00 | 8.8301E+00 | −1.8739E+01 |
| R9 | −3.7971E−01 | 1.4964E−02 | 3.2042E−01 | −1.3646E+00 | 3.9161E+00 | −5.4760E+00 |
| R10 | −1.1832E+00 | 1.3663E+00 | −5.7413E+00 | 1.7048E+01 | −3.4735E+01 | 4.7147E+01 |
| R11 | −3.6955E+00 | −1.2889E−01 | −1.0207E−01 | 3.5348E−01 | −4.6962E−01 | 3.6730E−01 |
| R12 | −5.2245E+00 | −7.2200E−02 | −2.8408E−03 | 4.1447E−02 | −4.3219E−02 | 2.4196E−02 |

| | Conic coefficient | Aspheric surface coefficients | | | |
|---|---|---|---|---|---|
| | k | A14 | A16 | A18 | A20 |
| R1 | −4.0399E+01 | −1.2745E−01 | −2.0784E−01 | 1.3286E−01 | −2.4412E−02 |
| R2 | 9.8984E+01 | −1.1652E+02 | 1.0323E+02 | −5.2743E+01 | 1.2623E+01 |
| R3 | −3.6672E+00 | −3.2782E+02 | 4.7132E+02 | −3.8060E+02 | 1.2804E+02 |
| R4 | 3.5584E+00 | 9.0087E+03 | −2.6957E+04 | 4.3955E+04 | −3.0193E+04 |
| R5 | 5.0334E−01 | 6.0815E+02 | −2.7728E+03 | 6.7355E+03 | −6.5804E+03 |
| R6 | 1.1748E+00 | 3.6065E+02 | −1.2724E+02 | −6.0535E+02 | 6.8369E+02 |
| R7 | 4.4318E+01 | 1.6290E+00 | 2.6451E+02 | −4.7715E+02 | 2.7556E+02 |
| R8 | −2.2202E+00 | 2.2104E+01 | −1.2122E+01 | 5.5756E−01 | 1.4592E+00 |
| R9 | −3.7971E−01 | 3.2522E+00 | −9.5578E−02 | −6.1462E−01 | 1.2830E−01 |
| R10 | −1.1832E+00 | −4.1057E+01 | 2.1982E+01 | −6.6126E+00 | 8.5958E−01 |
| R11 | −3.6955E+00 | −1.7680E−01 | 5.1306E−02 | −8.2256E−03 | 5.5917E−04 |
| R12 | −5.2245E+00 | −8.0976E−03 | 1.6058E−03 | −1.7362E−04 | 7.8762E−06 |

Table 15 and Table 16 show design data of inflexion points and arrest points of the lenses of the camera optical lens 40 according to the Fourth Embodiment of the present disclosure.

TABLE 15

| | Number of inflexion points | Inflexion point positions 1 | Inflexion point positions 2 | Inflexion point positions 3 |
|---|---|---|---|---|
| P1R1 | 1 | 0.225 | / | / |
| P1R2 | 1 | 0.075 | / | / |
| P2R1 | 3 | 0.485 | 0.725 | 0.745 |
| P4R1 | 1 | 0.135 | / | / |
| P4R2 | 1 | 0.325 | / | / |
| P5R1 | 2 | 0.595 | 0.855 | / |

TABLE 15-continued

| | Number of inflexion points | Inflexion point positions 1 | Inflexion point positions 2 | Inflexion point positions 3 |
|---|---|---|---|---|
| P5R2 | 1 | 0.775 | / | / |
| P6R1 | 1 | 0.515 | / | / |
| P6R2 | 1 | 0.505 | / | / |

TABLE 16

| | Number of arrest points | Arrest point positions 1 |
|---|---|---|
| P1R1 | 1 | 0.435 |
| P1R2 | 1 | 0.115 |
| P4R1 | 1 | 0.235 |
| P4R2 | 1 | 0.685 |
| P6R1 | 1 | 1.025 |
| P6R2 | 1 | 1.495 |

Figure 14:
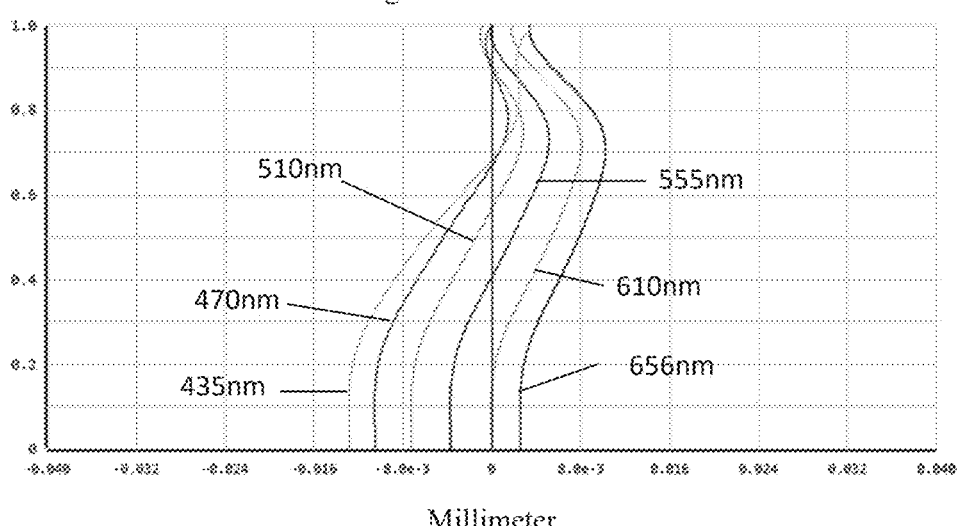
FIG. 14 is a schematic diagram of a longitudinal aberration of the camera optical lens shown in FIG. 13.
Figure 15:
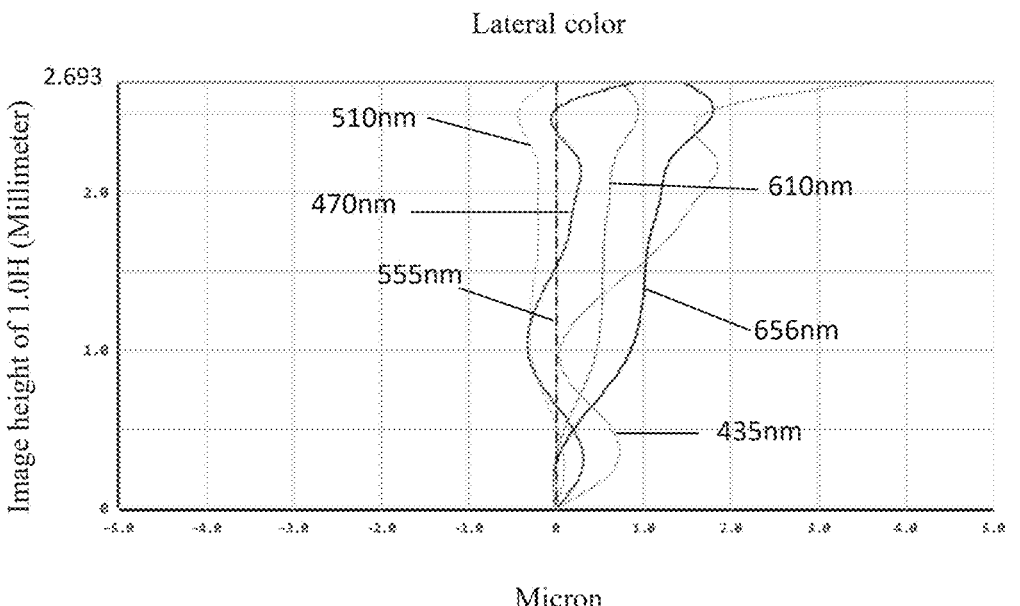
FIG. 15 is a schematic diagram of a lateral color of the camera optical lens shown in FIG. 13.
Figure 16:
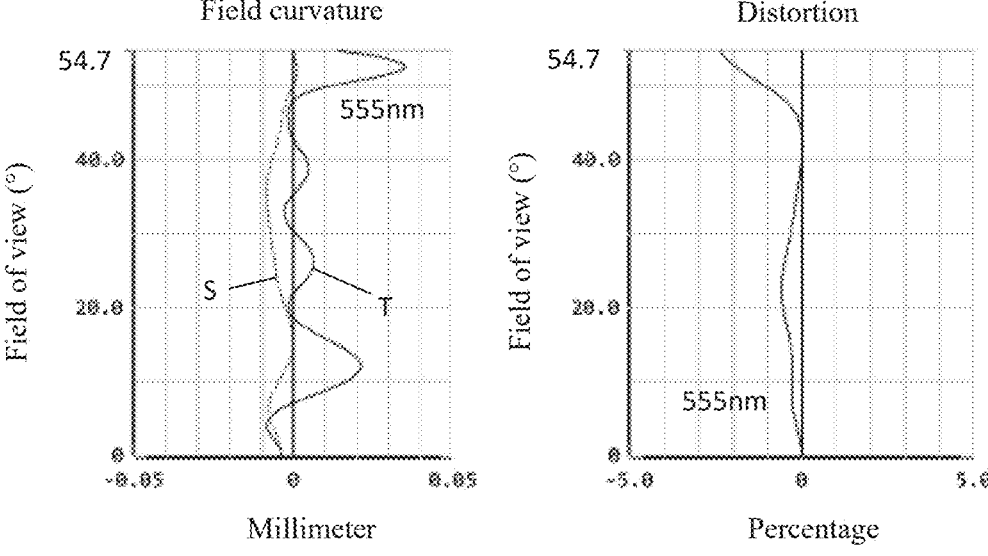
FIG. 16 is a schematic diagram of a field curvature and a distortion of the camera optical lens shown in FIG. 13.

FIG. 14 and FIG. 15 illustrate a longitudinal aberration and a lateral color of the camera optical lens 40 according to the Fourth Embodiment after light with wavelengths of 656 nm, 610 nm, 555 nm, 510 nm, 470 nm and 435 nm passing through the camera optical lens 40, respectively. FIG. 16 illustrates a field curvature and a distortion of the camera optical lens 40 after light with a wavelength of 555 nm passing through the camera optical lens 40 according to the Fourth Embodiment. A field curvature S in FIG. 16 is a field curvature in a sagittal direction, and T is a field curvature in a tangential direction.

In the embodiment, an entrance pupil diameter (ENPD) of the camera optical lens 40 is 0.887 mm, an image height IH of 1.0H is 2.693 mm, a field of view FOV in a diagonal direction is 109.47°. Thus, the camera optical lens 40 can meet the design requirements of a large aperture, a wide angle and ultra-thin, and its on-axis and off-axis chromatic aberrations are fully corrected, thereby achieving excellent optical characteristics.

Table 21 in the following shows various values in the First Embodiment, Second Embodiment, Third Embodiment and TABLE 17-continued

| R | | d | | nd | | vd |
|---|---|---|---|---|---|---|
| R11 | 2.352 | d11= | 0.395 | nd6 | 1.6153 | v6 | 26.00 |
| R12 | 0.544 | d12= | 0.569 | | | |
| R13 | ∞ | d13= | 0.110 | ndg | 1.5168 | vg | 64.17 |
| R14 | ∞ | d14= | 0.421 | | | |

Table 18 shows aspherical surface data of each lens of the camera optical lens 50 in the Comparative Example of the present disclosure.

TABLE 18

| | Conic coefficient | Aspheric surface coefficients | | | | |
|---|---|---|---|---|---|---|
| | k | A4 | A6 | A8 | A10 | A12 |
| R1 | −3.7062E+01 | 5.2264E−01 | −8.0838E−01 | 9.4080E−01 | −4.0079E−01 | −6.6408E−01 |
| R2 | 9.9000E+01 | 1.3718E+00 | −4.8341E+00 | 2.0017E+01 | −6.7893E+01 | 1.6284E+02 |
| R3 | −3.8512E+00 | 4.2002E−01 | −2.8459E+00 | 1.3006E+01 | −5.4625E+01 | 1.5839E+02 |
| R4 | 3.5272E+00 | −2.2376E−01 | −3.3990E−01 | −9.1214E+00 | 1.5304E+02 | −1.3636E+03 |
| R5 | −5.7336E−01 | −9.8893E−03 | 2.1883E−01 | −5.6612E+00 | 4.7322E+01 | −2.3617E+02 |
| R6 | 1.3606E+00 | −4.0508E−01 | 3.8307E−01 | 1.4696E+00 | −3.4073E+01 | 2.4385E+02 |
| R7 | 4.6865E+01 | −7.5707E−01 | 1.6409E+00 | −1.0573E+01 | 4.9847E+01 | −1.4093E+02 |
| R8 | −2.6313E+00 | −3.8099E−01 | 8.8245E−01 | −3.5279E+00 | 1.2261E+01 | −2.7002E+01 |
| R9 | −2.3847E−01 | 5.1325E−02 | −2.7528E−01 | 2.3865E+00 | −9.1334E+00 | 2.2238E+01 |
| R10 | −1.1780E+00 | 1.2708E+00 | −5.0149E+00 | 1.4417E+01 | −2.9086E+01 | 3.9647E+01 |
| R11 | −1.9253E+00 | −1.4676E−01 | 1.4898E−01 | −1.9924E−01 | 1.9838E−01 | −1.2810E−01 |
| R12 | −5.3278E+00 | −7.1994E−02 | 6.3693E−02 | −5.8529E−02 | 3.8971E−02 | −1.7027E−02 |

| | Conic coefficient | Aspheric surface coefficients | | | |
|---|---|---|---|---|---|
| | k | A14 | A16 | A18 | A20 |
| R1 | −3.7062E+01 | 1.3122E+00 | −1.0232E+00 | 3.9290E−01 | −6.0525E−02 |
| R2 | 9.9000E+01 | −2.6124E+02 | 2.6618E+02 | −1.5680E+02 | 4.1277E+01 |
| R3 | −3.8512E+00 | −3.0382E+02 | 3.7651E+02 | −2.6955E+02 | 8.2954E+01 |
| R4 | 3.5272E+00 | 6.9240E+03 | −2.0245E+04 | 3.1882E+04 | −2.1024E+04 |
| R5 | −5.7336E−01 | 6.5610E+02 | −7.7713E+02 | −3.9535E+02 | 1.3270E+03 |
| R6 | 1.3606E+00 | −9.8019E+02 | 2.2738E+03 | −2.8316E+03 | 1.4525E+03 |
| R7 | 4.6865E+01 | 2.1510E+02 | −1.2045E+02 | −7.1721E+01 | 8.7535E+01 |
| R8 | −2.6313E+00 | 3.5397E+01 | −2.5864E+01 | 8.8322E+00 | −7.5124E−01 |
| R9 | −2.3847E−01 | −3.3818E+01 | 3.0525E+01 | −1.4892E+01 | 2.9952E+00 |
| R10 | −1.1780E+00 | −3.5187E+01 | 1.9592E+01 | −6.2785E+00 | 8.9036E−01 |
| R11 | −1.9253E+00 | 5.2232E−02 | −1.2978E−02 | 1.7945E−03 | −1.0589E−04 |
| R12 | −5.3278E+00 | 4.7205E−03 | −7.9775E−04 | 7.4888E−05 | −2.9911E−06 |

Fourth Embodiment, and also values corresponding to parameters which are specified in the above conditions.

Comparative Example

The symbols in the Comparative Example have the same meanings as those in the First Embodiment.

Figure 17:
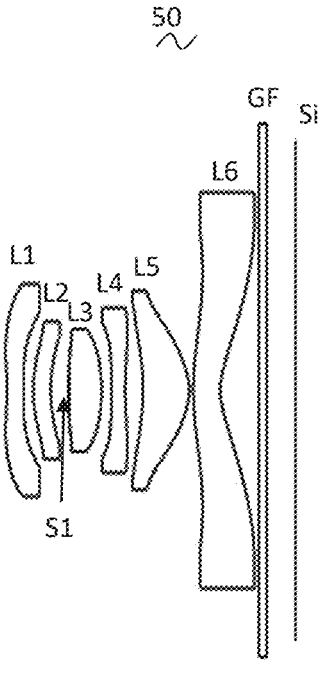
FIG. 17 is a schematic diagram of a structure of a camera optical lens according to a comparative example of the present disclosure.

FIG. 17 shows the camera optical lens 50 according to the Comparative Example of the present disclosure.

Table 17 and Table 18 show design data of a camera optical lens 50 according to the Comparative Example of the present disclosure.

TABLE 17

| | R | | d | | nd | | vd |
|---|---|---|---|---|---|---|---|
| R1 | −2.318 | d1= | 0.244 | nd1 | 1.5444 | v1 | 56.00 |
| R2 | −13.911 | d2= | 0.142 | | | | |
| R3 | 1.300 | d3= | 0.255 | nd2 | 1.5876 | v2 | 29.00 |
| R4 | 1.394 | d4= | 0.277 | | | | |
| S1 | ∞ | ds= | −0.022 | | | | |
| R5 | 3.070 | d5= | 0.487 | nd3 | 1.5444 | v3 | 56.00 |
| R6 | −1.875 | d6= | 0.140 | | | | |
| R7 | 7.532 | d7= | 0.209 | nd4 | 1.6610 | v4 | 20.53 |
| R8 | 3.223 | d8= | 0.258 | | | | |
| R9 | −2.185 | d9= | 0.675 | nd5 | 1.5444 | v5 | 56.00 |
| R10 | −0.535 | d10= | 0.061 | | | | |

Table 19 and Table 20 show design data of inflexion points and arrest points of the lenses of the camera optical lens 50 according to the Comparative Example of the present disclosure.

TABLE 19

| | Number of inflexion points | Inflexion point positions 1 | Inflexion point positions 2 | Inflexion point positions 3 |
|---|---|---|---|---|
| P1R1 | 1 | 0.235 | / | / |
| P1R2 | 1 | 0.075 | / | / |
| P2R1 | 2 | 0.485 | 0.715 | / |
| P3R1 | 1 | 0.475 | / | / |
| P4R1 | 2 | 0.135 | 0.755 | / |
| P4R2 | 1 | 0.315 | / | / |
| P5R1 | 2 | 0.605 | 0.855 | / |
| P5R2 | 1 | 0.795 | / | / |
| P6R1 | 1 | 0.635 | / | / |
| P6R2 | 3 | 0.545 | 2.145 | 2.215 |

TABLE 20

|  | Number of arrest points | Arrest point positions 1 |
| --- | --- | --- |
| P1R1 | 1 | 0.455 |
| P1R2 | 1 | 0.115 |
| P4R1 | 1 | 0.225 |
| P4R2 | 1 | 0.645 |
| P6R1 | 1 | 1.315 |
| P6R2 | 1 | 1.975 |

Figure 18:
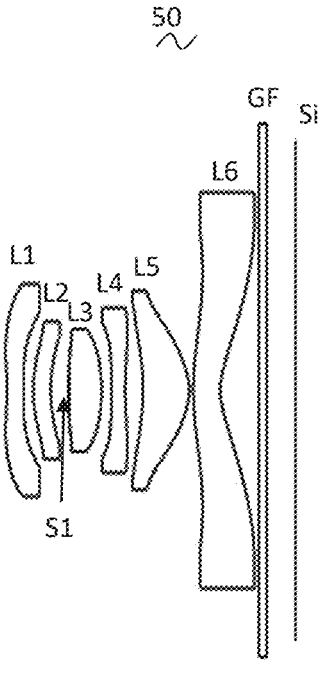
FIG. 18 is a schematic diagram of a longitudinal aberration of the camera optical lens shown in FIG. 17.
Figure 19:
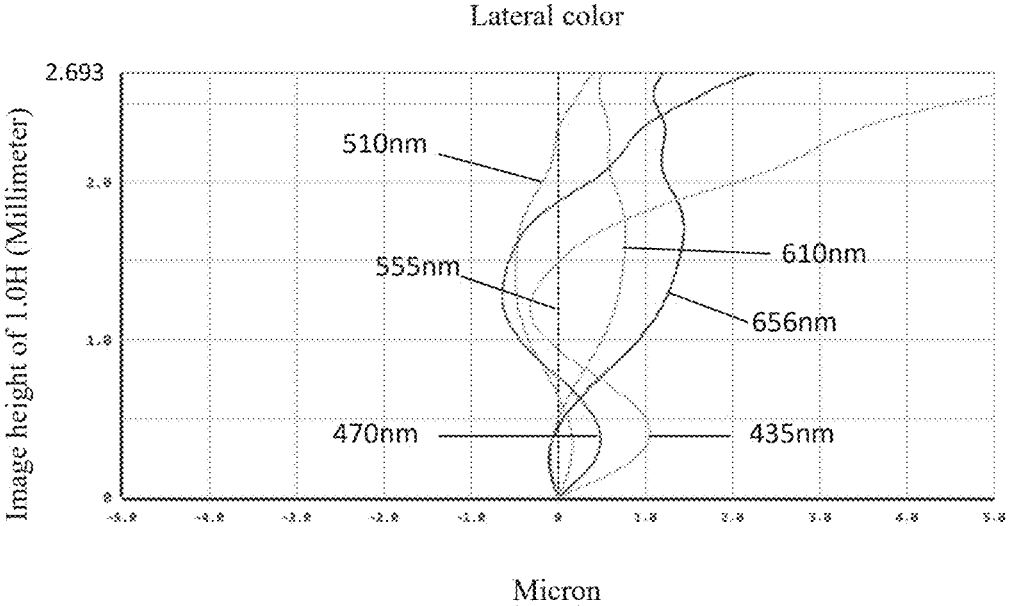
FIG. 19 is a schematic diagram of a lateral color of the camera optical lens shown in FIG. 17.
Figure 20:
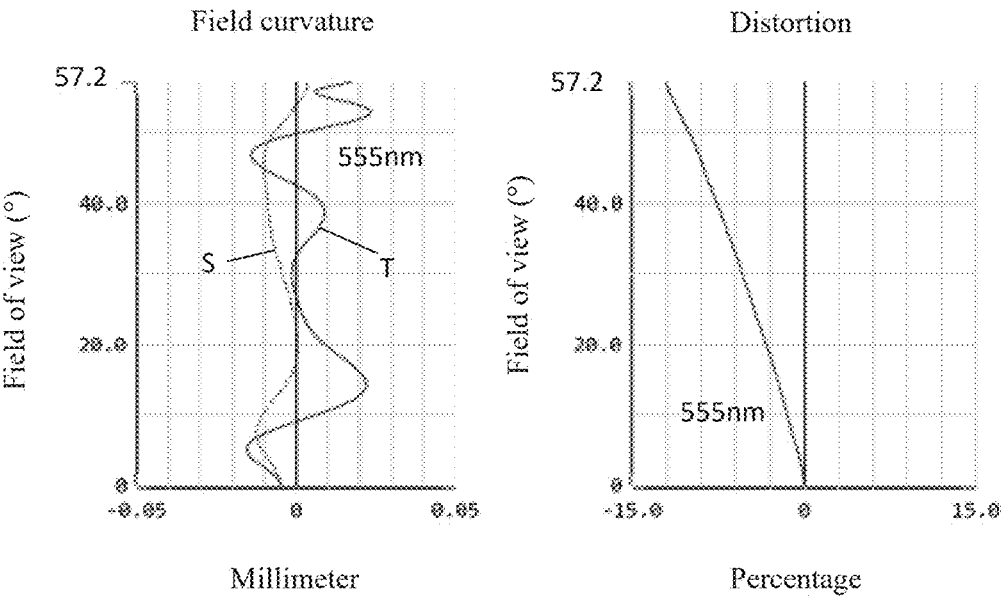
FIG. 20 is a schematic diagram of a field curvature and a distortion of the camera optical lens shown in FIG. 17.

FIG. 18 and FIG. 19 illustrate a longitudinal aberration and a lateral color of the camera optical lens 50 according to the Comparative Example after light with wavelengths of 656 nm, 610 nm, 555 nm, 510 nm, 470 nm and 435 nm passing through the camera optical lens 50, respectively. FIG. 20 illustrates a field curvature and a distortion of the camera optical lens 50 after light with a wavelength of 555 nm passing through the camera optical lens 50 according to the Comparative Example. A field curvature S in FIG. 20 is a field curvature in a sagittal direction, and Tis a field curvature in a tangential direction.

Table 21 in the following also shows various values in the Comparative Example corresponding to parameters in the above conditions. Obviously, the camera optical lens 50 according to the Comparative Example does not satisfy the above condition 2.50≤f2/f3≤7.00.

In the Comparative Example, an entrance pupil diameter (ENPD) of the camera optical lens 50 is 0.896 mm, an image height IH of 1.0H is 2.693 mm, a field of view FOV in a diagonal direction is 114.39°. Thus, the camera optical lens 50 cannot meet the design requirements of a wide angle.

TABLE 21

| Parameters and Conditions | First Embodimen | Second Embodiment | Third Embodimen | Fourth Embodimen | Comparative Example |
| --- | --- | --- | --- | --- | --- |
| (d5 + d9)/d7 | 4.74 | 4.92 | 4.97 | 5.14 | 5.55 |
| (R7 + R8)/ (R7 − R8) | 3.08 | 2.66 | 2.83 | 2.62 | 2.50 |
| R2/R1 | 10.52 | 25.00 | 6.12 | 6.00 | 6.00 |
| f | 1.972 | 1.940 | 1.954 | 1.948 | 1.969 |
| f1 | −4.385 | −3.590 | −4.777 | −5.122 | −5.132 |
| f2 | 9.195 | 5.830 | 11.723 | 15.515 | 16.294 |
| f3 | 2.321 | 2.320 | 2.277 | 2.230 | 2.208 |
| f4 | −9.338 | −8.727 | −8.856 | −8.521 | −8.616 |
| f5 | 1.139 | 1.150 | 1.159 | 1.155 | 1.134 |
| f6 | −1.409 | −1.401 | −1.407 | −1.390 | −1.248 |
| FNO | 2.20 | 2.20 | 2.20 | 2.20 | 2.20 |
| TTL | 4.017 | 3.999 | 4.025 | 4.029 | 4.220 |
| IH | 2.693 | 2.693 | 2.693 | 2.693 | 2.693 |
| FOV | 111.80 | 109.60 | 109.46 | 109.47 | 114.39 |

Those skilled in the art shall understand that the embodiments described above are specific embodiments for implementing the present disclosure. In practice, various changes may be made to these embodiments in form and in detail without departing from the spirit and scope of the disclosure.

What is claimed is:

1. A camera optical lens, comprising, from an object side to an image side in sequence, a first lens with a negative refractive power, a second lens with a positive refractive power, a third lens with a positive refractive power, a fourth lens with a negative refractive power, a fifth lens with a positive refractive power, and a sixth lens with a negative refractive power;

wherein the camera optical lens satisfies the following conditions:

$$6.00 \le R2/R1 \le 25.00;$$

$$2.00 \le (R7 + R8)/(R7 - R8) \le 9.00; \text{ and}$$

$$3.00 \le (d5 + d9)/d7 \le 9.00;$$

wherein

R1 represents a curvature radius of an object side surface of the first lens;

R2 represents a curvature radius of an image side surface of the first lens;

R7 represents a curvature radius of an object side surface of the fourth lens;

R8 represents a curvature radius of an image side surface of the fourth lens;

d5 represents an on-axis thickness of the third lens;

d7 represents an on-axis thickness of the fourth lens; and d9 represents an on-axis thickness of the fifth lens.

2. The camera optical lens according to claim 1, further satisfies the following condition:

$$2.00 \le TTL/f \le 2.30;$$

wherein

TTL represents a total track length of the camera optical lens; and f represents a focal length of the camera optical lens.

3. The camera optical lens according to claim 1, further satisfies the following condition:

$$-6.00 \le f6/d11 \le -3.00;$$

wherein f6 represents a focal length of the sixth lens; and d11 represents an on-axis thickness of the sixth lens.

4. The camera optical lens according to claim 1, further satisfies the following condition:

$$2.50 \le f2/f3 \le 7.00;$$

wherein f2 represents a focal length of the second lens; and f3 represents a focal length of the third lens.

5. The camera optical lens according to claim 1, wherein the object side surface of the first lens is concave in a paraxial region, and the image side surface of the first lens is convex in the paraxial region;

wherein the camera optical lens further satisfies the following conditions:

$$-5.26 \le f1/f \le -1.23;$$

$$-2.80 \le (R1 + R2)/(R1 - R2) \le -0.72; \text{ and}$$

$$0.02 \le d1/TTL \le 0.06;$$

wherein f1 represents a focal length of the first lens;

f represents a focal length of the camera optical lens;

d1 represents an on-axis thickness of the first lens; and

TTL represents a total track length of the camera optical lens.

6. The camera optical lens according to claim 1, wherein an object side surface of the second lens is convex in a paraxial region, and an image side surface of the second lens is concave in the paraxial region;

wherein the camera optical lens further satisfies the following conditions:

$$1.50 \le f2/f \le 11.95;$$

$$-54.86 \le (R3 + R4)/(R3 - R4) \le -4.92; \text{ and}$$

$$0.03 \le d3/TTL \le 0.11;$$

wherein f2 represents a focal length of the second lens;

f represents a focal length of the camera optical lens;

R3 represents a curvature radius of the object side surface of the second lens;

R4 represents a curvature radius of the image side surface of the second lens;

d3 represents an on-axis thickness of the second lens; and

TTL represents a total track length of the camera optical lens.

7. The camera optical lens according to claim 1, wherein an object side surface of the third lens is convex in a paraxial region, and an image side surface of the third lens is convex in the paraxial region;

wherein the camera optical lens further satisfies the following conditions:

$$0.57 \le f3/f \le 1.79;$$

$$0.11 \le (R5 + R6)/(R5 - R6) \le 0.37; \text{ and}$$

$$0.06 \le d5/TTL \le 0.18;$$

wherein f3 represents a focal length of the third lens;

f represents a focal length of the camera optical lens;

R5 represents a curvature radius of the object side surface of the third lens;

R6 represents a curvature radius of an image side surface of the third lens; and TTL represents a total track length of the camera optical lens.

8. The camera optical lens according to claim 1, wherein the object side surface of the fourth lens is convex in a paraxial region, and the image side surface of the fourth lens is concave in the paraxial region;

wherein the camera optical lens further satisfies the following conditions:

$$-9.47 \le f4/f \le -2.92; \text{ and}$$

$$0.03 \le d7/TTL \le 0.09;$$

wherein f4 represents a focal length of the fourth lens;

f represents a focal length of the camera optical lens; and

TTL represents a total track length of the camera optical lens.

9. The camera optical lens according to claim 1, wherein an object side surface of the fifth lens is concave in a paraxial region, and an image side surface of the fifth lens is convex in the paraxial region;

wherein the camera optical lens further satisfies the following conditions:

$$0.29 \le f5/f \le 0.89;$$

$$0.83 \le (R9 + R10)/(R9 - R10) \le 2.60; \text{ and}$$

$$0.09 \le d9/TTL \le 0.26;$$

wherein f5 represents a focal length of the fifth lens;

f represents a focal length of the camera optical lens;

R9 represents a curvature radius of the object side surface of the fifth lens;

R10 represents a curvature radius of the image side surface of the fifth lens; and TTL represents a total track length of the camera optical lens.

10. The camera optical lens according to claim 1, wherein an object side surface of the sixth lens is convex in a paraxial region, and an image side surface of the sixth lens is concave in the paraxial region;

wherein the camera optical lens further satisfies the following conditions:

$$-1.44 \le f6/f \le -0.48;$$

$$0.89 \le (R11 + R12)/(R11 - R12) \le 2.74; \text{ and}$$

$$0.04 \le d11/TTL \le 0.13;$$

wherein f6 represents a focal length of the sixth lens;

f represents a focal length of the camera optical lens;

R11 represents a curvature radius of the object side surface of the sixth lens;

R12 represents a curvature radius of the image side surface of the sixth lens;

d11 represents an on-axis thickness of the sixth lens; and

TTL represents a total track length of the camera optical lens.

* * * * *